United States Patent
Tran Van

(10) Patent No.: US 10,565,046 B2
(45) Date of Patent: Feb. 18, 2020

(54) FAULT DETECTION USING DATA DISTRIBUTION CHARACTERISTICS

(71) Applicant: Intel Corporation, Santa Clara, CA (US)

(72) Inventor: Hoang Tran Van, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 130 days.

(21) Appl. No.: 15/687,174

(22) Filed: Aug. 25, 2017

(65) Prior Publication Data

US 2018/0060155 A1    Mar. 1, 2018

Related U.S. Application Data

(60) Provisional application No. 62/382,329, filed on Sep. 1, 2016.

(51) Int. Cl.
*G06F 11/07* (2006.01)

(52) U.S. Cl.
CPC .......... *G06F 11/079* (2013.01); *G06F 11/076* (2013.01); *G06F 11/0709* (2013.01)

(58) Field of Classification Search
CPC .. G06F 11/0709; G06F 11/079; G06F 11/076; G06F 11/3452
See application file for complete search history.

(56) References Cited

U.S. PATENT DOCUMENTS

| | | | | |
|---|---|---|---|---|
| 6,836,800 B1 * | 12/2004 | Sweet | ................ | G06F 11/0709 709/224 |
| 8,656,226 B1 * | 2/2014 | Havemose | .......... | G06F 11/0715 714/47.3 |
| 9,015,536 B1 * | 4/2015 | Ricken | ................ | G06F 11/0709 714/47.3 |
| 9,069,819 B1 * | 6/2015 | Kumar | ................ | G06F 11/3051 |
| 9,323,599 B1 * | 4/2016 | Iyer | ..................... | G06F 11/0751 |
| 9,471,778 B1 * | 10/2016 | Seo | ..................... | H04L 63/1425 |
| 9,842,017 B1 * | 12/2017 | Zhang | .................. | G06F 11/079 |
| 2003/0110007 A1 * | 6/2003 | McGee | .............. | G06F 11/0709 702/179 |
| 2003/0139905 A1 * | 7/2003 | Helsper | ............... | G06F 11/3006 702/182 |
| 2004/0133395 A1 * | 7/2004 | Ding | ...................... | H04L 67/22 702/182 |
| 2004/0133398 A1 * | 7/2004 | Merkin | .............. | G06F 11/3006 702/188 |

(Continued)

*Primary Examiner* — Yolanda L Wilson
(74) *Attorney, Agent, or Firm* — Alliance IP, LLC

(57) ABSTRACT

Certain embodiments may include a method, system, apparatus, and/or machine accessible storage medium to: obtain baseline data associated with a device, wherein the baseline data comprises an indication of an expected performance of the device during healthy operation; obtain status data associated with the device, wherein the status data is obtained based on operational information monitored by a sensor; compute delta data based on a delta between the status data and the baseline data; compute a standard deviation of the delta data; compute a plurality of standard deviation bands based on the standard deviation of the delta data; compute a statistical distribution of the delta data based on the plurality of standard deviation bands; and detect a fault in the device based on the statistical distribution of the delta data.

25 Claims, 17 Drawing Sheets

(56) References Cited

U.S. PATENT DOCUMENTS

| | | | |
|---|---|---|---|
| 2005/0120111 A1* | 6/2005 | Bailey | G06F 11/3409 709/224 |
| 2013/0030761 A1* | 1/2013 | Lakshminarayan | G06K 9/6219 702/179 |
| 2013/0305093 A1* | 11/2013 | Jayachandran | G06F 11/0754 714/37 |
| 2014/0068348 A1* | 3/2014 | Mondal | H04L 41/16 714/45 |
| 2014/0244563 A1* | 8/2014 | Atomori | G06F 11/008 706/46 |
| 2014/0281755 A1* | 9/2014 | Kantareddy | G06F 11/0709 714/57 |
| 2014/0330958 A1* | 11/2014 | Ur | H04L 43/0876 709/224 |
| 2014/0359363 A1* | 12/2014 | Biem | G06F 11/3024 714/37 |
| 2015/0081132 A1* | 3/2015 | Shirokaze | G06F 1/206 700/300 |
| 2015/0269050 A1* | 9/2015 | Filimonov | G06F 11/3409 702/183 |
| 2016/0125720 A1* | 5/2016 | Chattopadhyay | G08B 21/187 340/514 |
| 2016/0217022 A1* | 7/2016 | Velipasaoglu | G06F 11/079 |
| 2017/0192872 A1* | 7/2017 | Awad | G06F 17/18 |
| 2018/0365090 A1* | 12/2018 | Ben Simhon | G06F 11/076 |

* cited by examiner

FAULT DETECTION USING DATA DISTRIBUTION CHARACTERISTICS

CROSS-REFERENCE TO RELATED APPLICATIONS

This patent application claims the benefit of the filing date of U.S. Provisional Patent Application Ser. No. 62/382,329, filed on Sep. 1, 2016, and entitled "Fault Detection Using Data Distribution Characteristics," the content of which is hereby expressly incorporated by reference.

TECHNICAL FIELD

This disclosure relates in general to the field of fault detection, and more particularly, to fault detection using data distribution characteristics.

BACKGROUND

All major industries develop and/or utilize many types of systems, equipment, and devices that are increasingly complex and composed of numerous high-value components, such as the transportation industry (e.g., airlines), industrial manufacturing industry, energy industry (e.g., power plants), telecommunications industry (e.g., Internet, cellular, and television service providers), medical industry (e.g., doctors, healthcare, pharmaceuticals), food processing industry, and/or retail industry. As the complexity of systems developed and/or used by these industries increases (along with the number and variety of underlying components), managing these systems may become exceptionally challenging, as the underlying components may be unreliable and/or susceptible to faults, failures, outages, errors, and/or other anomalies that may cause downtime or otherwise hinder operation.

DETAILED DESCRIPTION OF EXAMPLE EMBODIMENTS

Figure 1:
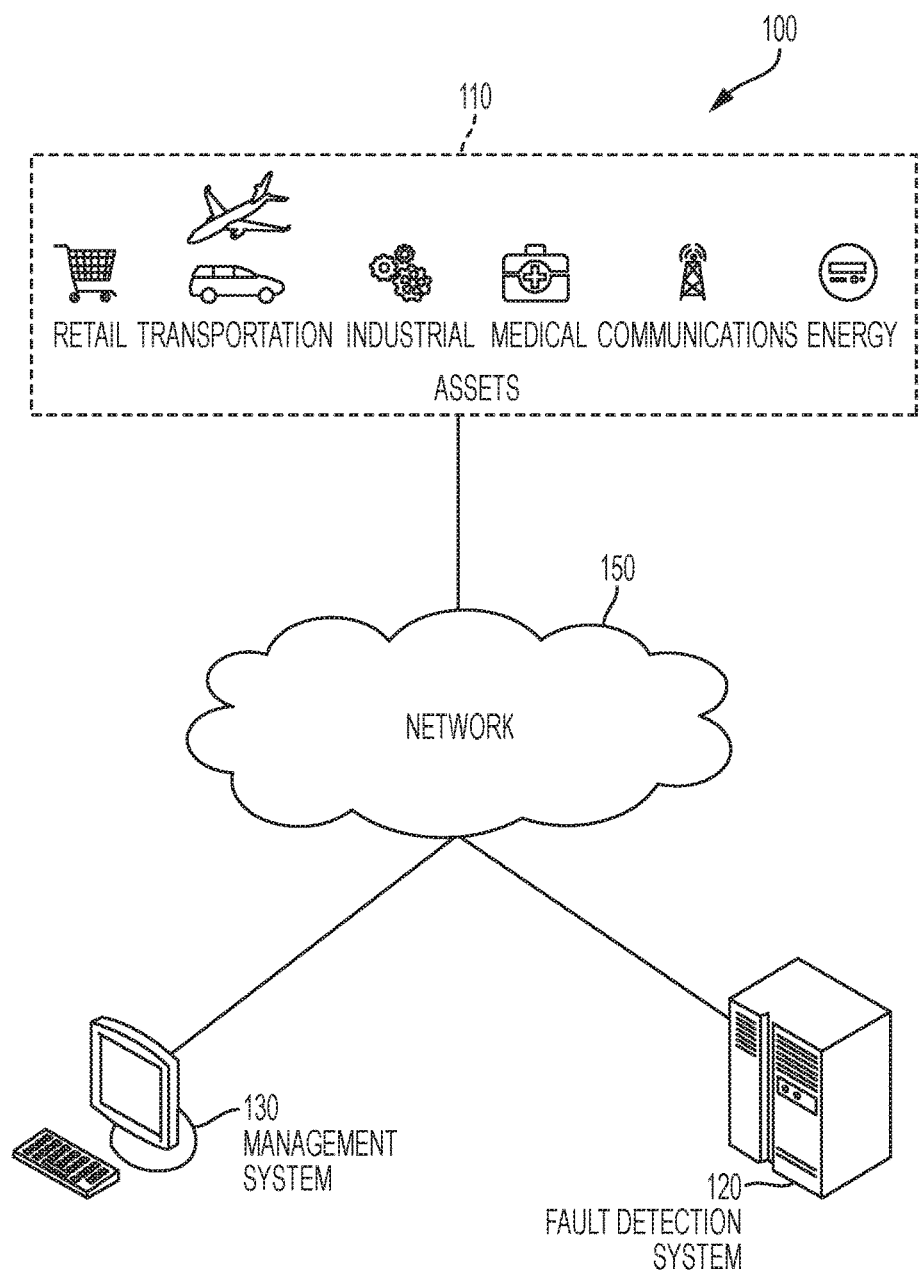
FIG. 1 illustrates a simplified schematic diagram of an example system for fault detection based on data distribution characteristics.

FIG. 1 illustrates a simplified schematic diagram of an example system 100 for detecting faults based on data distribution characteristics. In the illustrated embodiment, system 100 includes assets 110, management system 130, fault detection system 120, and network 150. Assets 110 may include, for example, any equipment and/or devices of system 100 that may be susceptible to faults or failures. Management system 130 may be used to manage system 100 and associated assets 110. Fault detection system 120 may be used to detect faults and failures of assets 110 and facilitate appropriate remedial measures. Finally, network 150 may be used to facilitate communication between assets 110, management system 130, and fault detection system 120.

Assets 110 may include, for example, any type of equipment and/or devices associated with any type of system 100 and/or industry, including transportation (e.g., airlines), industrial manufacturing, energy (e.g., power plants), telecommunications (e.g., Internet, cellular, and television service providers), medical (e.g., healthcare, pharmaceutical), food processing, and/or retail industries, among others. In the transportation industry, for example, assets 110 may include equipment and devices associated with aircrafts, automobiles, or vessels, such as internal mechanical and/or electrical components (e.g., engines), navigation systems, autonomous flight or driving systems, and traffic sensors and controllers. Assets 110 may also include equipment, devices, and/or infrastructure associated with industrial manufacturing and production, shipping (e.g., cargo tracking), communications networks (e.g., gateways, routers, servers, cellular towers), server farms, electrical power plants, wind farms, oil and gas pipelines, water treatment and distribution, wastewater collection and treatment, and weather monitoring (e.g., temperature, wind, and humidity sensors), among other examples. Assets 110 may also include "smart" appliances and systems, such as heating-ventilation-air conditioning (HVAC) systems, light controls, security systems (e.g., alarms, locks, cameras, motion detectors), entertainment systems (e.g., televisions, sound systems, videogame systems), and other smart household or office appliances (e.g., smart refrigerators, coffee brewers, washers and dryers). Assets 110 may also include mobile personal computing devices, such as laptops, smart phones or tablets, and wearable computing devices (e.g., smart watches, smart glasses, smart headsets, smart helmets, smart garments). Assets 110 may be statically located, such as a device mounted within a building, on a lamppost, sign, water tower, secured to a floor (e.g., indoor or outdoor), or other fixed or static structure. Assets 110 may also be mobile, such as aircraft sensors, in-vehicle sensors, in-package sensors (e.g., for tracking cargo), wearable devices worn by active human or animal users, and drones (e.g., aerial, ground-based, or underwater drones), among other examples.

Assets 110 may also include any individual components and/or parts of the examples above, such as rotating equipment, electric motors, electric generators, air compressors, oil pumps, sensors, processors, circuitry, memory, input/output devices, power sources, and any other mechanical and/or electrical components, among other examples.

Assets 110 may include various types of sensors for monitoring, detecting, measuring, and generating sensor data and signals describing characteristics of the environment in which they reside, are mounted, or are in contact with. For instance, a given sensor may be configured to detect one or more respective characteristics such as movement, weight, physical contact, temperature, wind, noise, light, computer communications, wireless signals, position, humidity, the presence of radiation, liquid, or specific chemical compounds, among several other examples. Indeed, this disclosure contemplates use and/or development of a potentially limitless universe of sensors, each capable of detecting and generating corresponding sensor data for new and known environmental characteristics. Sensors may be physical sensors or virtual sensors. A physical sensor may be any physical component, device, and/or equipment that monitors, detects, measures, and/or generates sensor data. A virtual sensor may be a software-based sensor, such as a mathematical model that generates an output using one or more inputs. The inputs of a virtual sensor may be, for example, virtual or software-based inputs, outputs from other sensors (physical or virtual), and/or any other information associated with an asset. In some embodiments, virtual sensors may be used as backups to physical sensors, or as cost-savings alternatives to physical sensors. Certain assets 110 may also include actuators, which allow the assets 110 to perform some type of action that affects their environment. For instance, one or more of the assets 110 may include one or more respective actuators that accepts an input and performs a respective action in response. Actuators can include controllers to activate additional functionality, such as an actuator to selectively toggle the power or operation of an alarm, camera (or other sensors), HVAC appliance, household appliance, in-vehicle device, or lighting appliance, among other examples.

Assets 110 may also include various types of computer processing, communications, storage, and and/or power capabilities. For example, certain assets 110 may include computer processors and/or communication interfaces to allow interoperation with other components of system 100, such as with management system 130, fault detection system 120, or other assets 110. Alternatively, or additionally, certain assets 110 may rely on intermediary components, such as gateways, to communicate with the various components of system 100.

In some embodiments, assets 110 can be incorporated in and/or form an Internet-of-Things (IoT) or machine-to-machine (M2M) system. IoT systems can refer to new or improved ad-hoc systems and networks composed of multiple different devices (e.g., assets 110) interoperating and synergizing to deliver one or more results or deliverables. Such ad-hoc systems are emerging as more and more products and equipment evolve to become "smart," in that they are controlled or monitored by computer processors and provided with communication capabilities, through computer-implemented mechanisms, with other computing devices (and products having network communication capabilities). For instance, IoT systems can include networks built from sensors and communication modules integrated in or attached to "things" (e.g., assets 110), such as equipment, toys, tools, vehicles, etc. and even living things (e.g., plants, animals, humans, etc.). In some instances, IoT systems can develop organically or unexpectedly, with a collection of sensors monitoring a variety of things and related environments, and interconnecting with data analytics systems and/or systems controlling one or more other smart devices to enable various use cases and applications. Further, IoT systems can be formed from devices that originally had no contact nor communication with each other, with the system being composed and automatically configured spontaneously or on the fly (e.g., in accordance with an IoT application defining or controlling the interactions). Further, IoT systems can often be composed of a complex and diverse collection of connected devices (e.g., assets 110), such as devices sourced or controlled by varied groups of entities and employing varied hardware, operating systems, software applications, and technologies. In some cases, IoT applications may be localized, such that a service is implemented utilizing an IoT system within a specific geographic area, room, or location. In some instances, IoT devices may connect to one or more gateway devices which may host a portion of management functionality (e.g., as shared with or supported by management system 130) and/or a portion of application service functionality (e.g., as shared with or supported by assets 110). Service logic and configuration data may be pushed (or pulled) to the gateway device and used to configure IoT devices within range or proximity of the gateway device to allow the set of devices to implement a particular service within that location. A gateway device may be implemented as a dedicated gateway element, or may be a multi-purpose or general purpose device, such as another IoT device or user device that itself may include sensors and/or actuators to perform tasks within an IoT system, among other examples. In some cases, IoT systems can interface (through a corresponding IoT management system or application or one or more of the participating IoT devices) with remote services, such as data storage, information services (e.g., media services, weather services), geolocation services, and computational services (e.g., data analytics, search, diagnostics, etc.) hosted in cloud-based and other remote systems. For instance, the IoT system can connect (e.g., directly or through a gateway) to a remote service over one or more networks (e.g., network 150). In some cases, the remote service can itself be considered an asset of an IoT application. Data received by a remotely-hosted service can be consumed by the governing IoT application and/or one or more of the component IoT devices to cause one or more results or actions to be performed, among other examples.

One or more networks (e.g., network 150) may be used to facilitate communication between assets 110 and other components of system 100. Such networks can include wired and/or wireless local networks, public networks, wide area networks, broadband cellular networks, the Internet, and the like. As noted above, a collection of devices, or endpoints, may participate in an Internet-of-things (IoT) network, which may utilize wireless local area networks (WLAN), such as those standardized under IEEE 802.11 family of standards, home-area networks such as those standardized under the Zigbee Alliance, personal-area networks such as those standardized by the Bluetooth Special Interest Group, cellular data networks, such as those standardized by the Third-Generation Partnership Project (3GPP), and other types of networks, having wireless, or wired, connectivity. For example, an endpoint device may also achieve connectivity to a secure domain through a bus interface, such as a universal serial bus (USB)-type connection, a High-Definition Multimedia Interface (HDMI), or the like. In some embodiments, a cloud computing network, or cloud, in communication with a mesh network of IoT devices (e.g., assets 110), which may be termed a "fog," may be operating at the edge of the cloud. A fog, in some instances, may be considered to be a massively interconnected network wherein a number of IoT devices are in communication with each other, for example, by radio links. This may be achieved, in some embodiments, using the open interconnect consortium (OIC) standard specification released by the Open Connectivity Foundation™ (OCF). This standard allows devices to discover each other and establish communications for interconnects. Other interconnection protocols may also be used, including, for example, Thread (a networking protocol for "smart" home automation devices, developed by an alliance of organizations named the "Thread Group"), the optimized link state routing (OLSR) Protocol, or the better approach to mobile ad-hoc networking (B.A.T.M.A.N.), among others.

Management system 130 may be used to configure, deploy, and manage system 100 and associated assets 110. For example, management system 130 may be used to orchestrate the deployment of the assets 110 for a particular system 100, including automated selection and configuration of the assets 110 to be deployed. Management system 130 may also allow users to configure settings and policies to govern how the assets 110 are to operate within the context of the system 100. In IoT embodiments, management system 130 may include a software-based IoT management platform to allow developers and end users to build and configure IoT applications and systems. An IoT application can provide software support to organize and manage the operation of a set of IoT devices (e.g., assets 110) for a particular purpose or use case. In some cases, an IoT application can be embodied as an application on an operating system of a user computing device, a mobile application for execution on a smart phone, tablet, smart watch, or other mobile device, a remote server, and/or a gateway device. In some cases, the application can have or make use of an application management utility (e.g., management system 130) that allows users to configure settings and policies governing how the set of devices (e.g., assets 110) are to operate within the context of the system 100. As described below, management system 130 may also coordinate with fault detection system 120 to manage faults, failures, outages, errors, and other anomalies detected on the various assets 110 within the system 100. Management system 130 may be implemented on a cloud-based server, gateway, end-user device, or other asset 110. Management system 130 may be hosted on a single system (e.g., a single server, end-user device, or gateway device, among other examples), or alternatively, management system 130 may be distributed across multiple hosting devices.

As the complexity of systems and the number and variety of their associated assets 110 continue to increase, the management of these systems becomes exceptionally complex and challenging. As one example, with the emergence of IoT systems, it is anticipated that over 50 billion devices will be available to be interconnected by the year 2020, potentially enabling enormous and world-changing opportunities in terms of technology breakthrough and business development. For instance, in home automation systems, automation of a home is typically increased as more IoT devices are added for use in sensing and controlling additional aspects of the home. A major obstacle in managing and maintaining complex systems, equipment, and devices is that the underlying components (e.g., assets 110) may be unreliable and/or susceptible to faults. The following examples are a few of many possible factors that contribute to system unreliability and instability:

Limited lifespan. Some assets have a limited lifespan and may eventually fail after a certain amount of time and/or use;

Unexpected failures. Some assets may simply fail unexpectedly;

Harsh operating environments. Some assets are operated in harsh environments, and sensor readings can drift in extreme environments (e.g., excessive heat, freezing temperatures, storms, underwater, underground, high altitudes);

Low quality. Some assets are low quality and "per se" unreliable. For example, many consumer-based products are designed to be low-cost, which often results in lower quality, durability, and overall reliability;

Unreliable power sources. Some assets run on unreliable power sources. For example, many assets utilize battery power for mobility and/or deployment flexibility (e.g., in the absence of a convenient or consistent wired power source), resulting in unreliability from battery drainage and limited battery lifespans;

Unreliable network connectivity. As many assets may be deployed beyond the reach of a wired network connection, wireless network connectivity is required, which may be unreliable and intermittent, particularly in certain environments.

All of the above issues may lead to unpredictable or anomalous sensor readings for assets 110, such as value drifting, random values, and null values, among other examples, which hereinafter may be referred to as "faults."

Online and cloud-monitoring of high value devices and equipment (e.g., assets 110) has become more effective and popular due to the development of advanced algorithms designed for health monitoring based on analysis of sensor signals. In general, references throughout this disclosure to "signals," "sensor signals," "status signals," "status data," and similar variations thereof, may refer to any representation of data based on readings, measurements, data, and/or other outputs from sensors. Heath monitoring algorithms are designed to detect specific faults of a system by discerning meaningful deviations between actual sensor signals (i.e., status data from live operation) and baseline sensor signals (i.e., baseline data from normal or healthy operation). This signal deviation may be referred to as a residual Delta, and in some embodiments, it may be calculated as the difference between the actual signal and the baseline signal (e.g., delta=actual signal−baseline signal). In some embodiments, faults may be detected using multiple sensors (e.g., sensors for temperature and pressure), and each sensor may have its own baseline data. In those embodiments, the baseline data for each sensor may be normalized against its operating condition, and the collective baseline data for all sensors may then be collapsed or grouped into a single set of normalized baseline data, which may improve accuracy when comparing actual sensor data to baseline data. Detecting signal deviations may allow detection of faults and anomalies in equipment and devices (e.g., assets 110) used by major industries, including transportation (e.g., airlines), industrial manufacturing, energy (e.g., power plants), telecommunications (e.g., Internet, cellular, and television service providers), medical (e.g., healthcare, pharmaceutical), food processing, and/or retail industries, among others. The accuracy of these fault detection methods, however, depends on the ability to distinguish and extract meaningful signal shifts due to fault symptoms from signal noise. While there are various techniques for removing noise from a signal, these signal filtering techniques often limit or eliminate the ability to detect faults, and thus delay detection of the faults. These shortcomings are addressed by the techniques described throughout this disclosure, which minimize or virtually eliminate signal filtering (e.g., noise filtering) and use novel strategies to extract faults that are either masked by noises or are too weak to detect by existing methods. These novel fault detection techniques are based on analyzing the data distribution in signals from sensors associated with the monitored devices and equipment.

In the illustrated embodiment, fault detection system 120 may be used to implement the fault detection functionality described throughout this disclosure. For example, assets 110 may be susceptible to faults, failures, outages, errors, and/or other anomalies that may cause system 100 downtime or otherwise hinder operation of the system 100 or assets 110. Fault detection system 120 may detect and manage faults, failures, outages, errors, and other anomalies of the various assets 110 of system 100. Fault detection system 120 may also facilitate appropriate remedial measures in response to a fault, either by itself or in conjunction with other components or entities (e.g., management system 130, system administrators, and/or other systems or entities). For example, fault detection system 120 may reconfigure or recalibrate the faulty assets 110, disable the faulty assets 110, activate back-up or redundant assets 110, order replacement assets 110, and/or prompt another machine or human to take action in response to a fault. In various embodiments, fault detection system 120 may be implemented remotely over a network (e.g., via network servers and/or cloud services), locally on the assets 110 themselves, and/or in a distributed approach across various components of system 100. The particular component(s) performing fault detection functionality may depend on the embodiment and/or circumstances. For example, in some embodiments, fault detection may be performed remotely over a network if the assets 110 are delay tolerant, have limited processing and storage capabilities, and/or generate large volumes of sensor data. Alternatively, if an asset 110 requires time-sensitive fault detection and recovery, has sufficient processing and storage capabilities, has limited or no communication bandwidth, and/or generates relatively small volumes of sensor data, the asset 110 may perform fault detection and/or recovery itself, which may reduce latency, preserve bandwidth, and preserve battery life by avoiding continuous network communication.

Fault detection functionality of fault detection system 120 is described further throughout this disclosure in connection with the remaining FIGURES.

Any, all, or some of the computing devices of system 100 may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

While FIG. 1 is described as containing or being associated with a plurality of elements, not all elements illustrated within system 100 of FIG. 1 may be utilized in each alternative implementation of the present disclosure. Additionally, one or more of the elements described in connection with the examples of FIG. 1 may be located external to system 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Figure 2:
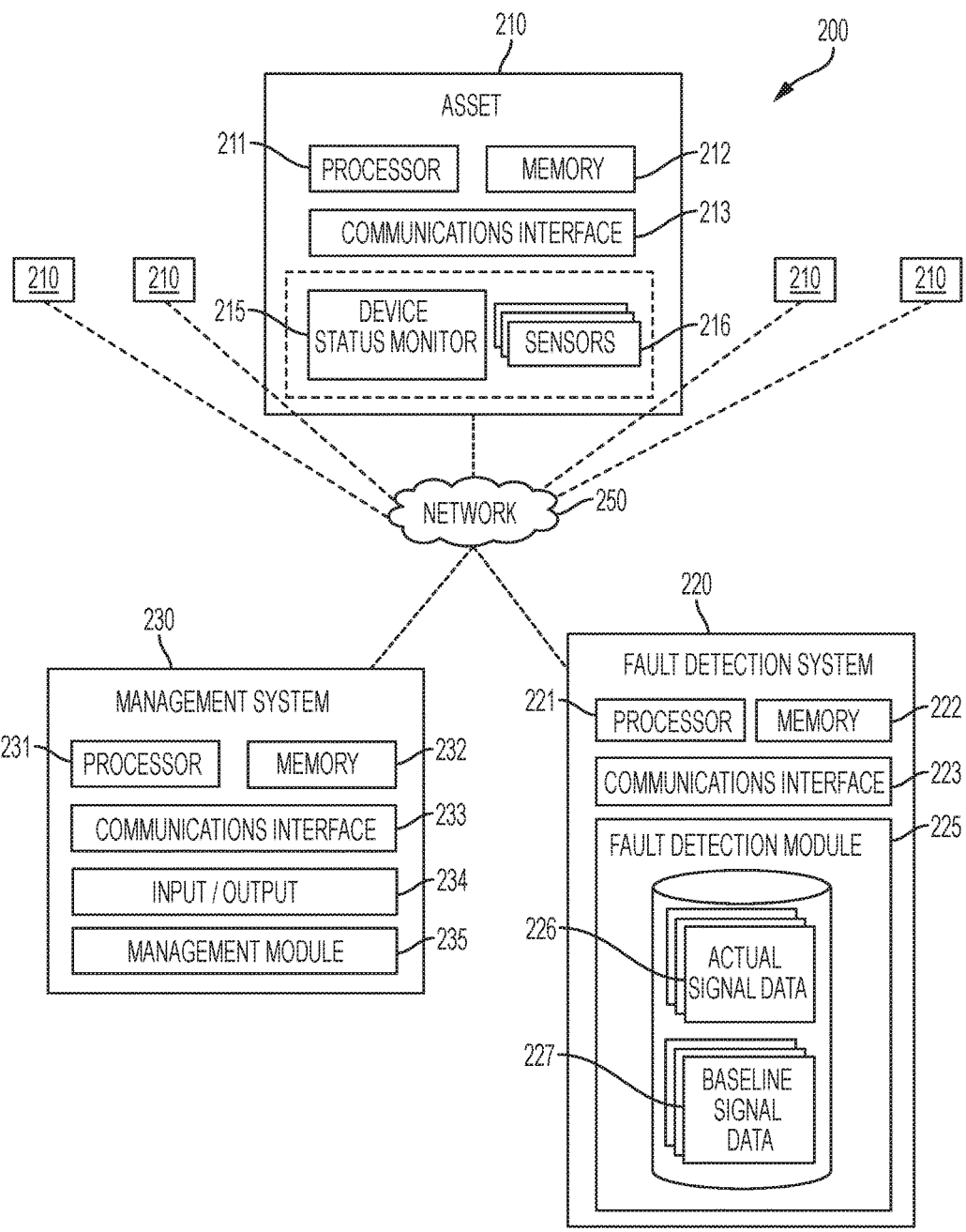
FIG. 2 illustrates a simplified block diagram of an example system for fault detection based on data distribution characteristics.

FIG. 2 illustrates a simplified block diagram of an example system 200 for fault detection based on data distribution characteristics. In the illustrated embodiment, system 200 includes assets 210, management system 230, fault detection system 220, and network 250. In some embodiments, assets 210 may be similar to assets 110 of FIG. 1; management system 230 may be similar to management system 130 of FIG. 1; fault detection system 220 may be similar to fault detection system 120 of FIG. 1; and network 250 may be similar to network 150 of FIG. 1.

Assets 210 may include, for example, any type of equipment and/or devices associated with any type of system 200 and/or industry, as described in connection with FIG. 1. As shown in the illustrated embodiment, an asset 210 may include one or more processors 211, one or more memory elements 212, one or more communications interfaces 213, one or more sensors 216, and a device status monitor 215, among other components. Each asset 210 may include other hardware and/or software components to realize the intended function(s) of the device. Communications interface 213 may include hardware and/or software to facilitate communication with other components over one or more networks 250, utilizing one or more communication technologies (e.g., Wi-Fi, Bluetooth, Near Field Communications, Zigbee, Ethernet). Sensors 216 may be used for monitoring, detecting, measuring, and generating sensor data and signals describing their operating environment. Device status monitor 215 may be used to monitor the operation of an asset 210 using signals from sensors 216, and communicate the sensor signal information to fault detection system 220 to facilitate fault detection. In some embodiments, device status monitor 215 (and other components) may be implemented utilizing code executable by processor 211.

One or more networks 250 may be used to facilitate communication between assets 210 and other components of system 200 (e.g., other assets 210, management system 230, and/or fault detection system 220), as described in connection with FIG. 1.

Management system 230 may be used to configure, deploy, and manage system 200 and associated assets 210, as described in connection with FIG. 1. Management system 230 may similarly include one or more processors 231, one or more memory elements 232, one or more communication interfaces 233 (e.g., for communication with other components over one or more networks 250), an input and/or output interface 234, and a management module 235. Management module 235 (and other components) may be implemented utilizing code executable by the processor 231 to manage the system 200 and associated assets 210. In some cases, management system 230 may be implemented on a dedicated physical system (e.g., separate from other components or assets 210 of system 200). For instance, management system 230 may be implemented on a network server (e.g., a cloud server) or other network component (e.g., a gateway device used to facilitate communication with and between multiple assets 210 within a particular location). In some instances, management system 230 may be hosted at least in part on an asset 210. Indeed, the management system 230 (and management module 235) may be implemented on multiple devices, with some functionality of management system 230 hosted on one device and other functionality hosted on other devices. Management system 230 may, in some cases, be hosted partially or entirely remote from the environment in which the assets 210 are deployed. Indeed, management system 230 may be implemented using one or more remote computing systems, such as cloud-based resources, that are remote from the assets 210 in a given system 200.

Fault detection system 220 may detect and manage faults, failures, outages, errors, and other anomalies of the various assets 210 of system 200, as described in connection with FIG. 1. Fault detection system 220 may similarly include one or more processors 221, one or more memory elements 222, one or more communication interfaces 223 (e.g., for communication with other components over one or more networks 250), and a fault detection module 225. Fault detection module 225 (and other components) may be implemented utilizing code executable by the processor 221 to detect faults in assets 210 by monitoring data generated by their associated sensors to determine when their operation deviates from what is expected. In some cases, fault detection system 220 may be implemented on a dedicated physical system (e.g., separate from other components or assets 210 of system 200). For instance, fault detection system 220 may be implemented on a network server (e.g., a cloud server) or other network component (e.g., a gateway device used to facilitate communication with and between multiple assets 210 within a particular location). In some instances, fault detection system 220 may be hosted at least in part on an asset 210. Indeed, the fault detection system 220 (and fault detection module 225) may be implemented on multiple devices, with some functionality of fault detection system 220 hosted on one device and other functionality hosted on other devices. Fault detection system 220 may, in some cases, be hosted partially or entirely remote from the environment in which the assets 210 are deployed. Indeed, fault detection system 220 may be implemented using one or more remote computing systems, such as cloud-based resources, that are remote from the assets 210 in a given system 200.

Fault detection system 220 may detect faults by analyzing the data distribution in signals from sensors 216 associated with the monitored assets 210. For example, during the steady-state operation of a healthy machine (e.g., system 200 and assets 210), fault detection system 220 may record sensor signals to establish a baseline signal. Fault detection system 220 may then record the actual sensor signal during ongoing operation of the machine. In the illustrated embodiment, for example, the baseline sensor signals 227 and the actual sensor signals 226 are stored by fault detection module 225 of fault detection system 220. As the machine degrades (e.g., gradually over time), the residual Delta between the actual and baseline signals (e.g., Delta=Actual Signal−Baseline Signal) may begin emerging, but a fault may not be apparent if the actual signal is masked by noise. As the degradation continues, the fault severity may increase until it becomes dominant. Even then, however, existing fault symptom recognition techniques may not be definitive, as spurious signals may adversely affect the fault detection process. To minimize the impact of spurious signals, signal filtering may be used to reduce the overall noise level. However, the reduction in noise also negatively impacts the ability to detect faults, as the fault amplitude is reduced and delayed with respect to time. To address this dilemma, this disclosure describes an effective and simple solution to detect system faults at their infancy stage and timely perform the appropriate remedial actions to prevent machine breakdown (e.g., reconfigure or recalibrate the faulty assets 210, disable the faulty assets 210, activate back-up or redundant assets 210, order replacement assets 210, alert the appropriate maintenance personnel).

This solution is based on the fact that the statistical distribution of data in a sensor signal differs for healthy assets 210 versus faulty assets 210. To detect a subtle change in a sensor signal due to a minor fault, each data point of the signal is analyzed and classified based on its magnitude relative to the statistical characteristics established for the baseline signal during healthy operation. Accordingly, the profile of the signal data distribution between the faulty and healthy assets 210 may be established by classifying the residual Delta based on its value relative to various standard deviation bands. Next, the statistical properties of each standard deviation band for the actual signal are compared with the corresponding statistical properties for the healthy baseline signal, allowing faults to be identified by recognizing and distinguishing subtle differences in the data distribution of a sensor signal across its entire statistical range. For example, when a fault or anomaly in an asset 210 first emerges, the data distribution of a sensor signal slowly migrates across statistical bands, such as from one standard deviation ($\sigma$) band to the next. When there is a meaningful statistical migration of the signal's data points to a new statistical band (e.g., $\pm 2\sigma$ to $\pm 3\sigma$, or beyond), the probability of a fault is high. This migration of data between statistical bands of a signal may be used to identify faults at the onset.

This solution provides a new dimension to signal monitoring, signal anomaly, and fault detection techniques, thereby modernizing fault detection by detecting faults at their onset and in many scenarios where existing techniques may fail altogether. This solution is extremely smooth, as it requires no signal filtering even when the nature of the signal is noisy. The result is a solution that is simple, accurate, and less susceptible to noise than existing approaches, providing a breakthrough in data anomaly and fault detection functionality.

Various example use cases of this fault detection solution are described in connection with the remaining FIGURES. These use cases demonstrate that this fault detection solution is robust, effective, and easy to interpret, allowing faults to be identified at their onset with ample lead time for performing remedial measures before a system failure or alarm.

Figure 3A:
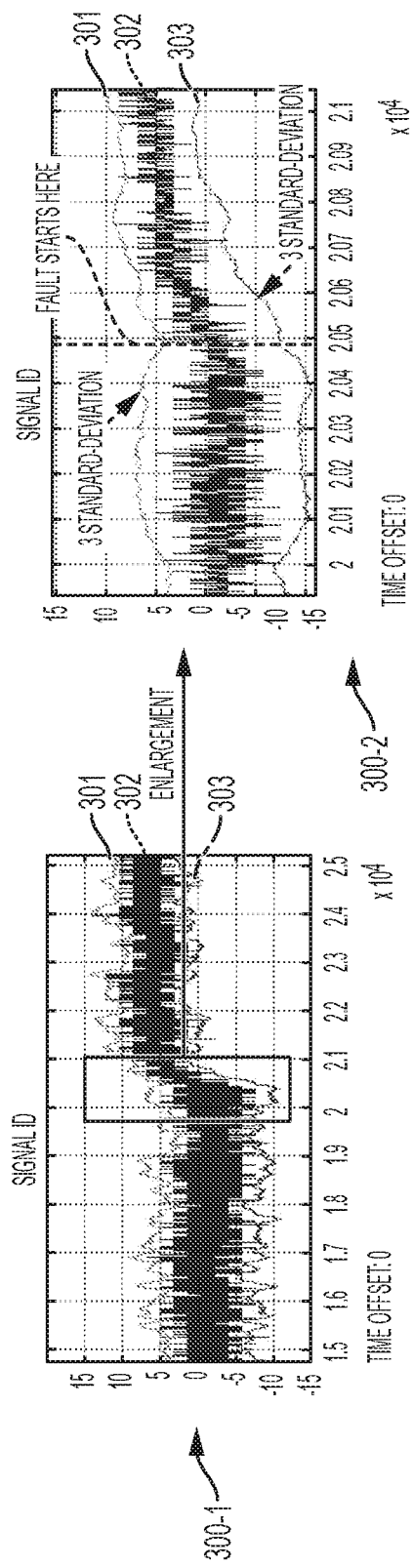
FIGS. 3A and 3B illustrate an example use case of fault detection for an air compressor.
Figure 3B:
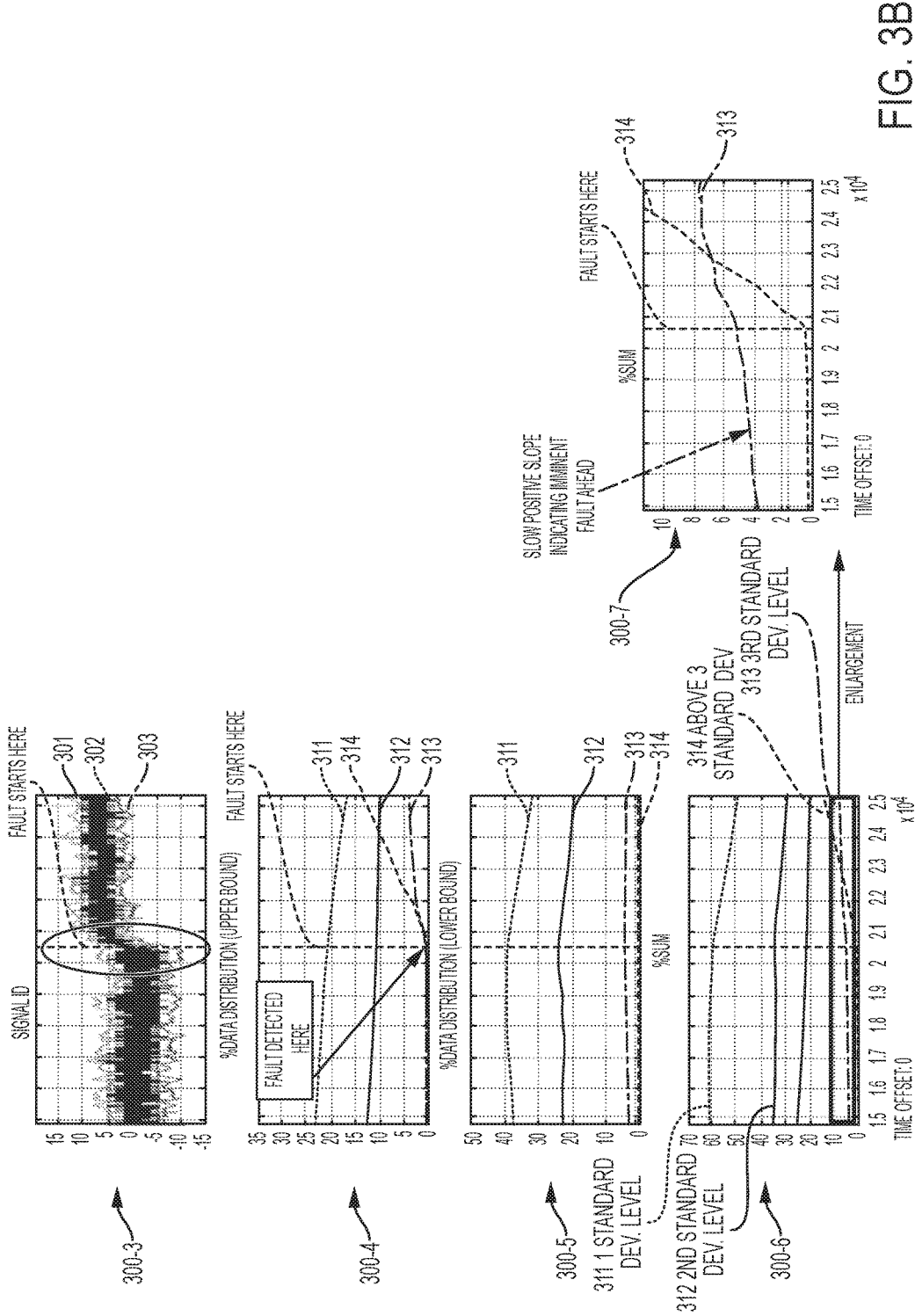

FIGS. 3A and 3B illustrate an example use case of fault detection for an air compressor. FIG. 3A illustrates fault detection using bounded signal limits, while FIG. 3B illustrates fault detection based on signal data distribution. The signals illustrated in these figures are based on the bearing housing temperature of an air compressor (e.g., an Intel oil-free air compressor or other suitable air compressor). FIGS. 3A and 3B illustrate calculations from one week of data collected before and after a fault in the air compressor, with one data point (i.e., temperature measurement) collected per minute. The data illustrated in this use case and the other use cases discussed throughout this disclosure may be collected, for example, using a Supervisory Control and Data Acquisition (SCADA) system or other suitable monitoring system.

FIG. 3A illustrates a fault detection approach using bounded signal limits. FIG. 3A includes graphs 300-1 and 300-2, with graph 300-2 being an enlargement of the portion of graph 300-1 where the fault occurs. There are three signal calculations plotted by the graphs illustrated in FIG. 3A: signal 302 represents the temperature delta (DeltaT) between the actual temperature and the baseline temperature (i.e., DeltaT=actual temperature−baseline temperature); signal 301 represents a fault detection limit of positive three standard deviations ($+3\sigma$); and signal 303 represents a fault detection limit of negative three standard deviations ($-3\sigma$). The fault detection approach illustrated in FIG. 3A may trigger an alert, for example, when there are multiple consecutive violations (e.g., three to five violations) of the DeltaT signal 302 exceeding the fault detection limits ($+-3\sigma$) defined by signals 301 and 303. Multiple consecutive violations may be required, for example, to reduce false alarms due to noisy and spurious signals. Examination of this approach in FIG. 3A reveals an upward shift of the DeltaT signal 302 lasting for approximately 1.5 hours until returning to the steady-state. No fault was detected by the illustrated approach, however, because there were never multiple consecutive violations of the DeltaT signal 302 exceeding the fault detection limits (+−3σ) defined by signals 301 and 303. Thus, this fault detection approach was unable to detect any anomaly or fault during the upward DeltaT shift, and the air compressor was forced to shut down one month later. Accordingly, the performance of this fault detection approach for the illustrated use case was a failure because it failed to recognize the fault during the 1.5 hour period with the abnormal shift in the DeltaT signal 302, and the air compressor continued to operate for another month before it was forced to shut down. After the incident, an investigation revealed that an air cooling system designed to cool the bearings of the air compressor was faulty.

FIG. 3B illustrates an alternative fault detection approach using signal data distribution for the same incident as FIG. 3A. This alternative fault detection approach is illustrated in FIG. 3B by graphs 300-4, 300-5, 300-6, and 300-7. For comparison, the fault detection approach from FIG. 3A is also illustrated in FIG. 3B by graph 300-3.

Fault detection using signal data distribution characteristics is based on the premise that the data distribution characteristics of the Delta signal across multiple standard deviation bands are unique for a healthy signal versus a faulty signal. In addition, the mean value of a signal that follows this general premise must be biased in order to accurately establish the data distribution. The distribution of data in the Delta signal can be bucketed into multiple statistical bands defined based on its standard deviation. In one embodiment, for example, the data in the Delta signal may be bucketed into the following ranges, or statistical bands:

over 3 standard deviations [3σ, ∞];
2 to 3 standard deviations [2σ, 3σ];
1 to 2 standard deviations [1σ, 2σ];
mean to 1 standard deviation [mean, 1σ];
mean to −1 standard deviation [mean, −1σ];
−1 to −2 standard deviations [−1σ, −2σ];
−2 to −3 standard deviations [−2σ, −3σ]; and
below −3 standard deviations [−3σ, −∞].

Faults may then be detected based on behavioral changes in the distribution of data in each statistical band, as illustrated further in graphs 300-4, 300-5, 300-6, and 300-7.

Graph 300-4 illustrates the distribution of data above the mean value of the Delta signal. Signal 311 represents the percentage of data within the mean to 1 standard deviation ([mean, 1σ]). Signal 312 represents the percentage of data within 1 to 2 standard deviations ([1σ, 2σ]). Signal 313 represents the percentage of data within 2 to 3 standard deviations ([2σ, 3σ]). Signal 314 represents the percentage of data beyond 3 standard deviations ([3σ, ∞]).

Graph 300-5 illustrates the distribution of data below the mean value of the Delta signal. Signal 311 represents the percentage of data within the mean to −1 standard deviation ([mean, −1σ]). Signal 312 represents the percentage of data within −1 to −2 standard deviations ([−1σ, −2σ]). Signal 313 represents the percentage of data within −2 to −3 standard deviations ([−2σ, −3σ]). Signal 314 represents the percentage of data beyond −3 standard deviations ([−3σ, −∞]).

Graph 300-6 illustrates the entire distribution of data, which is the sum of the distribution percentages from graphs 300-4 and 300-5. Signal 311 represents the $1^{st}$ standard deviation level, which is the percentage of data within +−1 standard deviation ([−1σ, 1σ]). Signal 312 represents the $2^{nd}$ standard deviation level, which is the percentage of data within +−1 to 2 standard deviations ([1σ, 2σ], [−1σ, −2σ]). Signal 313 represents the $3^{rd}$ standard deviation level, which is the percentage of data within +−2 to 3 standard deviations ([2σ, 3σ], [−2σ, −3σ]). Signal 314 represents the remaining standard deviation levels, or the 4+ standard deviation level, which is the percentage of data beyond +−3 standard deviations ([3σ, ∞], [−3σ, −∞]). Graph 300-7 represents an enlargement of a portion of graph 300-6.

The declining trends of signals 311 and 312 in these graphs are accompanied by the increasing trends of signals 313 and 314, which represent a shift in the data of the Delta signal from the lower standard deviation bands to the higher bands. The declining trends of signals 311 and 312 are indicative of fault symptoms that occur long before the actual fault itself, which is represented by the sudden emergence of signals 313 and 314.

Figure 4A:
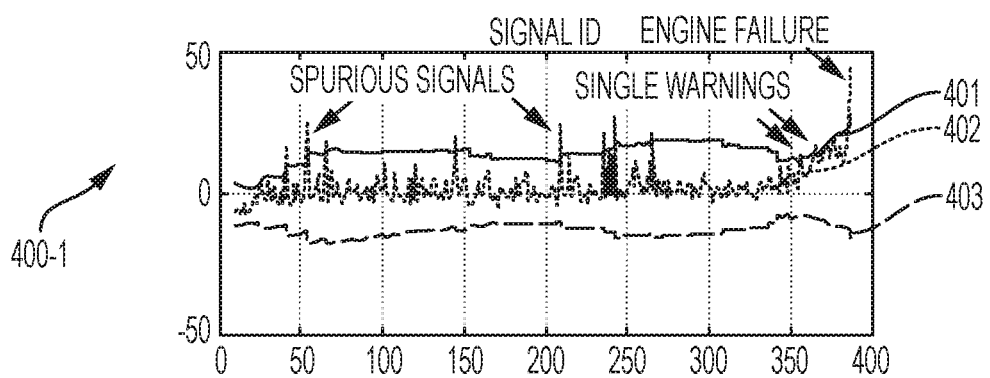
FIGS. 4A and 4B illustrate an example use case of fault detection for an aircraft engine.
Figure 4B:
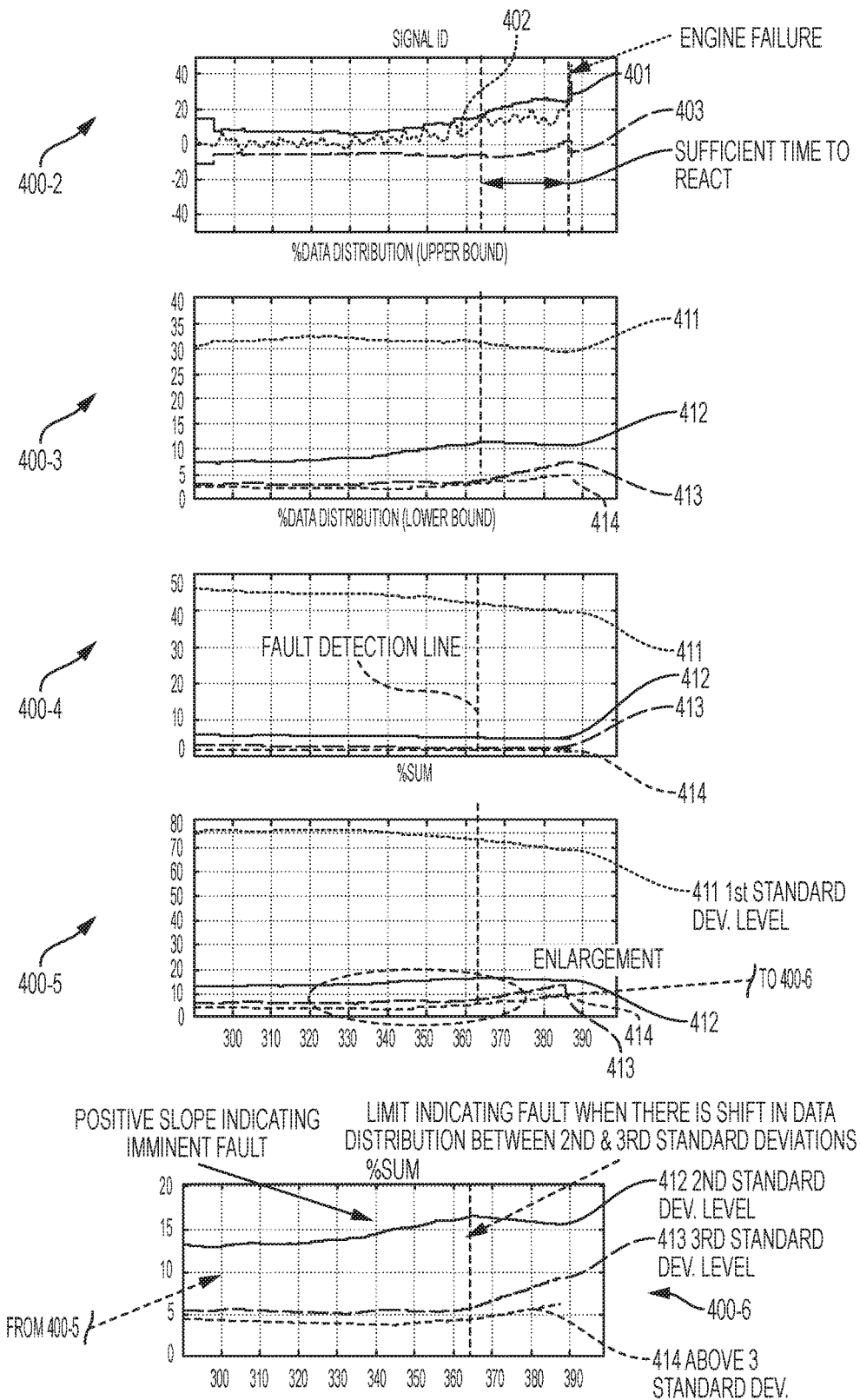

FIGS. 4A and 4B illustrate an example use case of fault detection for an aircraft engine. FIG. 4A illustrates fault detection using bounded signal limits, while FIG. 4B illustrates fault detection based on signal data distribution. In this use case, the performance of the aircraft engine (Y axis) was monitored during each flight (X axis) for five months. The aircraft ultimately had a right engine failure while cruising at an altitude of 33,000 feet.

FIG. 4A illustrates fault detection using bounded signal limits. There are three signal calculations plotted by graph 400-1 of FIG. 4A: signal 402 represents the delta between the actual engine performance and the baseline engine performance (i.e., delta=actual engine performance−baseline engine performance); signal 401 represents a fault detection limit of positive three standard deviations (+3σ); and signal 403 represents a fault detection limit of negative three standard deviations (−3σ). As described throughout this disclosure, fault detection approaches that use bounded signal limits may involve triggering fault alerts when there are multiple consecutive violations (e.g., three to five violations) of the delta signal 402 exceeding the fault detection limits (+−3σ) defined by signals 401 and 403. While FIG. 4A reveals various signal violations during the five-month monitoring period (e.g., from spurious signals and single fault symptoms/warnings), those violations were isolated events and thus none were identified as faults by this fault detection approach. Accordingly, this fault detection approach failed to reliably detect the engine failure with sufficient lead time (e.g., 3 to 5 flights before engine failure) to allow the maintenance crew to react.

FIG. 4B illustrates an alternative fault detection approach using signal data distribution for the same incident as FIG. 4A. This alternative fault detection approach is illustrated in FIG. 4B by graphs 400-3, 400-4, 400-5, and 400-6. For comparison, the fault detection approach from FIG. 4A is also illustrated in FIG. 4B by graph 400-2.

Graph 400-3 illustrates the distribution of data above the mean value of the Delta signal. Signal 411 represents the percentage of data within the mean to 1 standard deviation ([mean, 1σ]). Signal 412 represents the percentage of data within 1 to 2 standard deviations ([1σ, 2σ]). Signal 413 represents the percentage of data within 2 to 3 standard deviations ([2σ, 3σ]). Signal 414 represents the percentage of data beyond 3 standard deviations ([3σ, ∞]).

Graph 400-4 illustrates the distribution of data below the mean value of the Delta signal. Signal 411 represents the percentage of data within the mean to −1 standard deviation ([mean, −1σ]). Signal 412 represents the percentage of data within −1 to −2 standard deviations ([−1σ, −2σ]). Signal 413 represents the percentage of data within −2 to −3 standard deviations ([−2σ, −3σ]). Signal 414 represents the percentage of data beyond −3 standard deviations ([−3σ, −∞]).

Graph 400-5 illustrates the entire distribution of data, which is the sum of the distribution percentages from graphs 400-3 and 400-4. Signal 411 represents the $1^{st}$ standard deviation level, which is the percentage of data within +−1 standard deviation ([−1σ, 1σ]). Signal 412 represents the $2^{nd}$ standard deviation level, which is the percentage of data within +−1 to 2 standard deviations ([1σ, 2σ], [−1σ, −2σ]). Signal 413 represents the $3^{rd}$ standard deviation level, which is the percentage of data within +−2 to 3 standard deviations ([2σ, 3σ], [−2σ, −3σ]). Signal 414 represents the remaining standard deviation levels, or the 4+ standard deviation level, which is the percentage of data beyond +−3 standard deviations ([3σ, ∞], [−3σ, −∞]). Graph 400-6 represents an enlargement of a portion of graph 400-5.

FIG. 4B demonstrates that fault detection using signal data distribution does not suffer from the same limitations as fault detection using bounded signal limits. For example, graph 400-6 reveals a clear shift in data distribution from the $2^{nd}$ to $3^{rd}$ standard deviation level at flight #362 (shown by the decrease of signal 412 and increase of signal 413), prior to a catastrophic engine failure at flight #387 (shown by the abrupt disappearance of the signals). Thus, there was a total of 25 flights between the positive fault detected at flight #362 and the actual engine failure at flight #387. Furthermore, graph 400-6 reveals that, prior to the positive fault detected at flight #362, there was a slow but clear degradation in engine performance around flight #335, as indicated by the migration of data distribution from the $1^{st}$ standard deviation level to the $2^{nd}$ standard deviation level (shown by the decrease of signal 411 and the increase of signal 412). Thus, there was an additional warning period during the 27 flights prior to the first positive fault detection. Moreover, the increase in data in the 4+ standard deviation level [3σ, ∞], [−3σ, −∞] (signal 414) strongly indicates that the fault was progressing dangerously.

Figure 5:
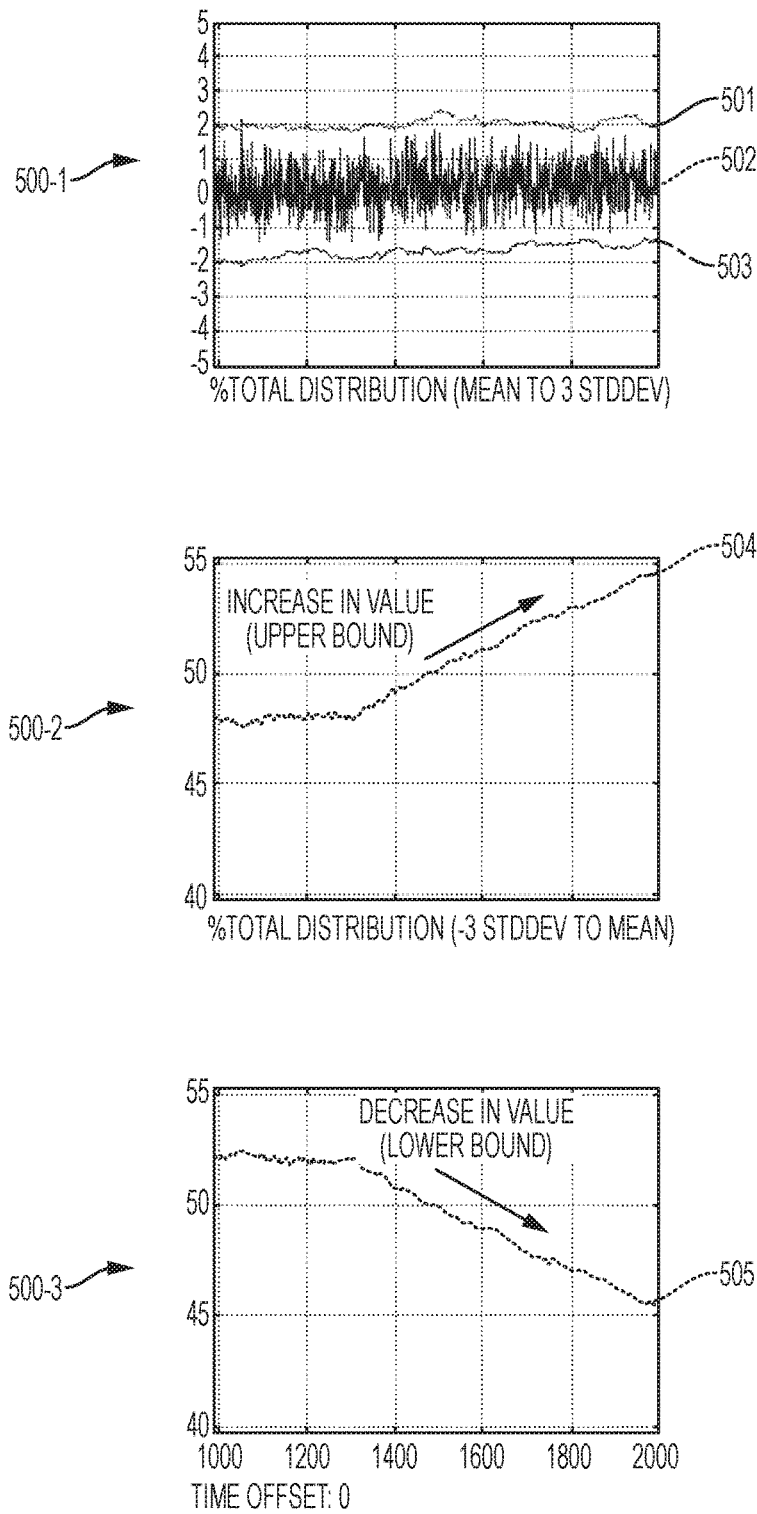
FIG. 5 illustrates an example use case of fault detection for an oil pump in a power generation plant.

FIG. 5 illustrates an example use case of fault detection for an oil pump in a power generation plant.

Graph 500-1 of FIG. 5 illustrates fault detection using bounded signal limits. There are three signal calculations plotted by graph 500-1: signal 502 represents the delta between the actual pump discharge pressure and the baseline pump discharge pressure (i.e., delta=actual pressure−baseline pressure); signal 501 represents a fault detection limit of positive three standard deviations (+3σ); and signal 503 represents a fault detection limit of negative three standard deviations (−3σ). As described throughout this disclosure, fault detection approaches that use bounded signal limits may involve triggering fault alerts when there are multiple consecutive violations (e.g., three to five violations) of the delta signal 502 exceeding the fault detection limits (+−3σ) defined by signals 501 and 503. Graph 500-1 reveals that there were no such violations throughout the duration of this use case, and thus no faults were detected using this fault detection approach. In fact, the variation of delta signal 502 was relatively constant, remaining bounded within ±2 psi. The power plant continued operating until being shut down due to generator overheat resulting from insufficient oil flow. An investigation revealed that sealing debris from the oil pump was in the discharge line, partially blocking the flow of oil in the cooling system. As demonstrated by graph 500-1, it was extremely difficult to detect any anomaly or fault using this fault detection approach.

Graphs 500-2 and 500-3 of FIG. 5 illustrate an alternative fault detection approach using signal data distribution for the same incident as in graph 500-1. Graph 500-2 illustrates the upper-bound data distribution, which is the percentage of data within 3 standard deviations above the mean value of the Delta signal ([mean, 3σ]). Graph 500-3 illustrates the lower-bound data distribution, which is the percentage of data within 3 standard deviations below the mean value of the Delta signal ([mean, −3σ]). Using this fault detection approach, the fault could have been detected around the 1300-1400 time frame when the total upper-bound distribution ([mean, 3σ]) started increasing rapidly, as shown by the increase of signal 504. Similarly, the fault is confirmed by the decrease in the total lower-bound distribution ([mean, −3σ]), as shown by the decrease of signal 505.

Figure 6:
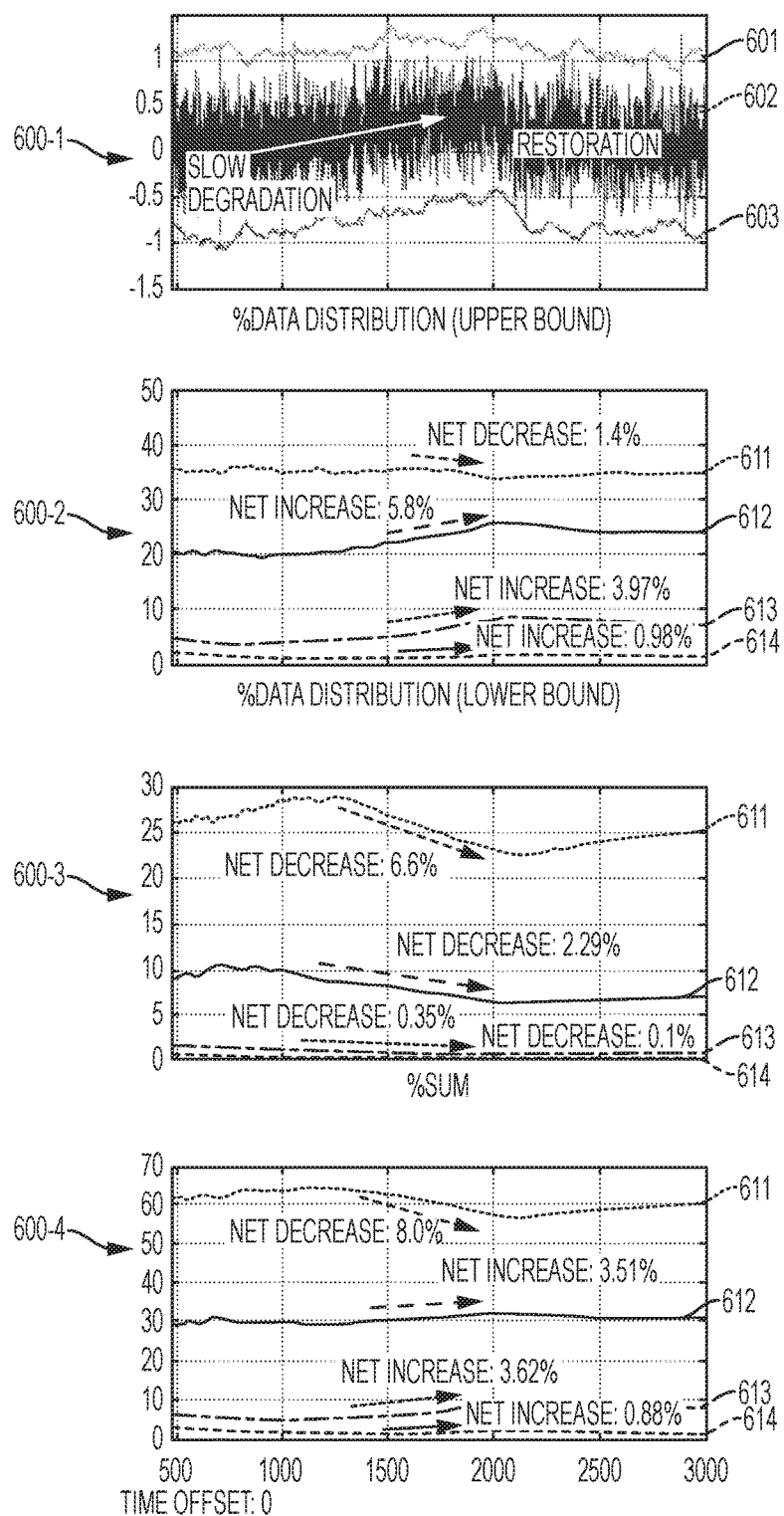
FIG. 6 illustrates an example use case of fault detection for gradual faults.

FIG. 6 illustrates an example use case of fault detection for gradual faults. In this illustrated use case, the degradation occurs very gradually until ultimately resulting in a fault. Graph 600-1 illustrates fault detection using bounded signal limits, while graphs 600-2, 600-3, and 600-4 illustrate fault detection based on signal data distribution.

Graph 600-1 illustrates fault detection using bounded signal limits. There are three signal calculations plotted by graph 600-1: signal 602 represents the delta between the actual sensor data and the baseline sensor data (i.e., delta=actual−baseline); signal 601 represents a fault detection limit of positive three standard deviations (+3σ); and signal 603 represents a fault detection limit of negative three standard deviations (−3σ). As described throughout this disclosure, fault detection approaches that use bounded signal limits may trigger fault alerts when there are multiple consecutive violations (e.g., three to five violations) of the delta signal 602 exceeding the fault detection limits (+−3σ) defined by signals 601 and 603. However, while graph 600-1 reveals various signal violations (e.g., from spurious signals and/or fault symptoms), those violations were isolated events and thus none were identified as faults using this fault detection approach. Accordingly, this fault detection approach failed to detect any anomalies or faults for this use case.

Graphs 600-2, 600-3, and 600-4 illustrate fault detection using signal data distribution for the same incident as graph 600-1. As shown by these graphs, this fault detection approach is able to detect the fault.

Graph 600-2 illustrates the distribution of data above the mean value of the Delta signal. Signal 611 represents the percentage of data within the mean to 1 standard deviation ([mean, 1σ]). Signal 612 represents the percentage of data within 1 to 2 standard deviations ([1σ, 2σ]). Signal 613 represents the percentage of data within 2 to 3 standard deviations ([2σ, 3σ]). Signal 614 represents the percentage of data beyond 3 standard deviations ([3σ, ∞]).

Graph 600-3 illustrates the distribution of data below the mean value of the Delta signal. Signal 611 represents the percentage of data within the mean to −1 standard deviation ([mean, −1σ]). Signal 612 represents the percentage of data within −1 to −2 standard deviations ([−1σ, −2σ]). Signal 613 represents the percentage of data within −2 to −3 standard deviations ([−2σ, −3σ]). Signal 614 represents the percentage of data beyond −3 standard deviations ([−3σ, −∞]).

Graph 600-4 illustrates the entire distribution of data, which is the sum of the distribution percentages from graphs 600-2 and 600-3. Signal 611 represents the $1^{st}$ standard deviation level, which is the percentage of data within +−1 standard deviation ([−1σ, 1σ]). Signal 612 represents the $2^{nd}$ standard deviation level, which is the percentage of data within +−1 to 2 standard deviations ([1σ, 2σ], [−1σ, −2σ]). Signal 613 represents the $3^{rd}$ standard deviation level, which is the percentage of data within +−2 to 3 standard deviations ([2σ, 3σ], [−2σ, −3σ]). Signal 614 represents the remaining standard deviation levels, or the 4+ standard deviation level, which is the percentage of data beyond +−3 standard deviations ([3σ, ∞], [−3σ, −∞]).

Graphs 600-2, 600-3, and 600-4 demonstrate that a fault can be detected by analyzing the signal data distribution characteristics. For example, before the degradation begins around time 1300, the data in graph 600-4 is distributed as follows: the $1^{st}$ standard deviation level (signal 611) contains roughly 64% of the data; the $2^{nd}$ standard deviation level (signal 612) contains roughly 29% of the data; the $3^{rd}$ standard deviation level (signal 613) contains roughly 5% of the data; and the 4+ standard deviation level [3σ, ∞], [−3σ, −∞] (signal 614) contains roughly 2% of the data. The degradation begins around time 1300 and continues until the system is restored around time 2100, as shown in graph 600-1 by the increasing amplitude of the signals prior to the restoration. Prior to the system restoration, graph 600-2 shows that signal 611 decreases slightly by 1.4% while signal 612 and signal 613 steadily increase by 5.8% and 3.97%, respectively. This indicates that that data in the [mean, 1σ] band migrates to the [1σ, 2σ] band, increasing its density by 1.4%. However, the net increase of the [1σ, 2σ] band is 5.8%, so an additional 4.4% of data (5.8%−1.4%=4.4%) migrated to this band from elsewhere. The additional 4.4% of data migrated from the [mean, −1σ] band in graph 600-3, as shown by the following calculation: 6.6%−A %=4.4%, where the value of A % (2.2%) is confirmed by the independent calculation below. Similarly, the 3.97% net increase of the [2σ, 3σ] band in graph 600-2 is the result of a net decrease in each band in graph 600-3, as shown by the following calculation: 3.97%=(2.29%+0.35%+0.1%=2.74%)+(A %−0.98%), where the value of A %=2.21%, which only differs from the above value of A % by 0.01% (2.21%−2.2%=0.01%) due to a rounding error.

This detailed calculation shows how each data point is distributed and migrated across each statistical significance boundary. By continuously monitoring the evolution of these distributions, it is very easy to detect the onset of a fault before it occurs. This fault detection approach is capable of detecting abnormal signal behavior from gradual degradations since even slow or gradual changes in each statistical band are clearly observable. By tracking the profile of the data distribution, it is possible to assess the significance of a fault and generate different warning and alert levels appropriately.

Figure 7:
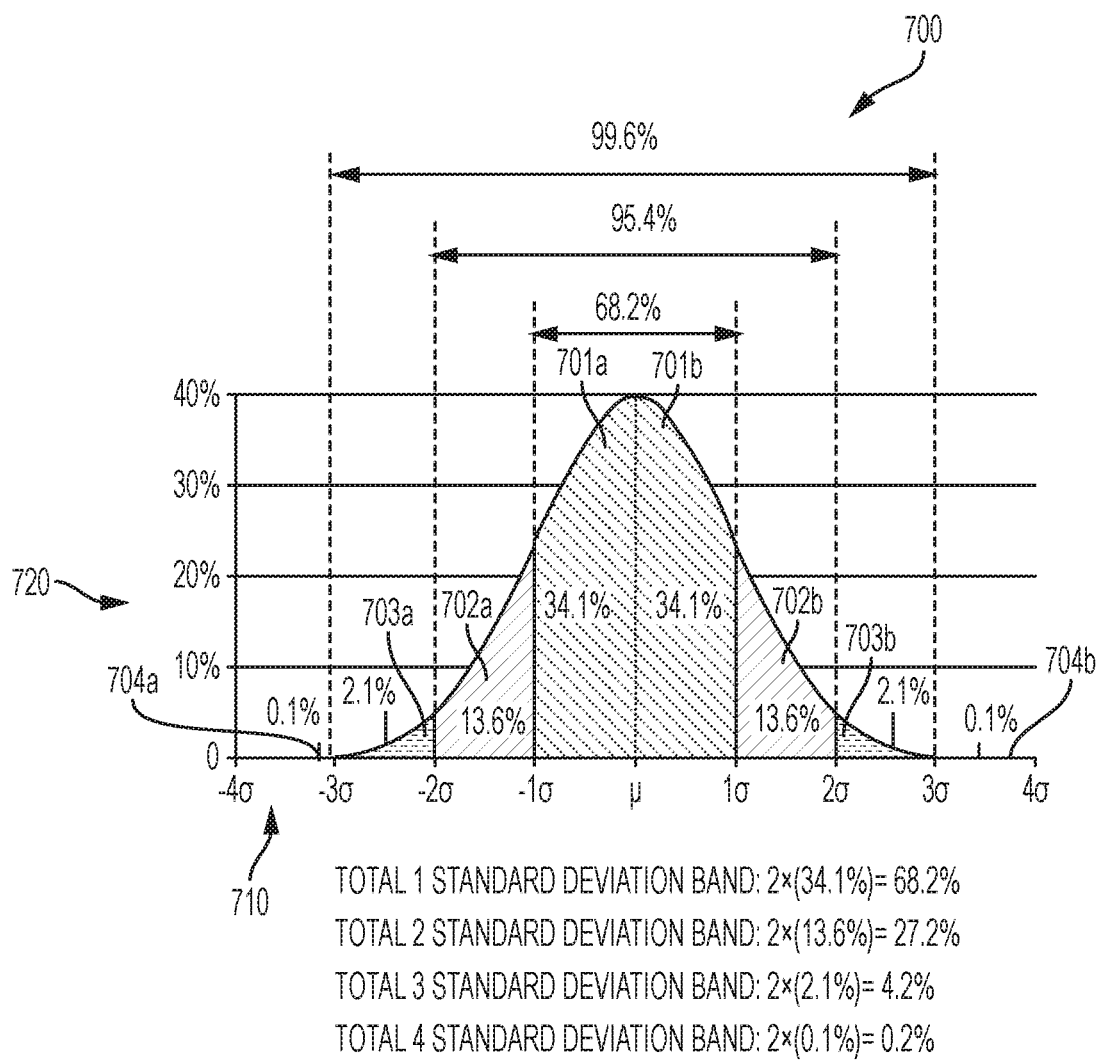
FIG. 7 illustrates an example of Gaussian distribution characteristics used for fault detection.

FIG. 7 illustrates an example of Gaussian distribution characteristics used for fault detection. Gaussian (normal) data distributions exhibit the following statistical properties: 68% of the data is within 1 standard deviation; 95% of the data is within 2 standard deviations; and 99.7% of the data is within 3 standard deviations. Fault detection based on signal data distribution may be implemented using Gaussian distribution characteristics for use cases with Gaussian data distributions. However, fault detection based on signal data distribution does not require Gaussian distributions—it can be implemented for use cases with any type of data distribution, such as log-normal distributions or any other non-Gaussian distribution.

In statistics, the distribution of data across its entire range of values can be characterized using the standard deviation as the common unit to form different data layers, or statistical bands. For example, the Gaussian distribution illustrated in FIG. 7 is divided into the following ranges, or statistical standard deviation bands:
- over 3 standard deviations [3σ, ∞] (denoted as 704b);
- 2 to 3 standard deviations [2σ, 3σ] (denoted as 703b);
- 1 to 2 standard deviations [1σ, 2σ] (denoted as 702b);
- mean to 1 standard deviation [mean, 1σ] (denoted as 701b);
- mean to −1 standard deviation [mean, −1σ] (denoted as 701a);
- −1 to −2 standard deviations [−1σ, −2σ] (denoted as 702a);
- −2 to −3 standard deviations [−2σ, −3σ] (denoted as 703a); and
- below −3 standard deviations [−3σ, −∞] (denoted as 704a).

These 8 total standard deviation bands form 4 distinct standard deviation bands under a Gaussian distribution:
- $1^{st}$ standard deviation band (denoted as the combination of 701a and 701b): data within +−1 standard deviation, [−1σ, 1σ]; contains 68.2% of the total data;
- $2^{nd}$ standard deviation band (denoted as the combination of 702a and 702b): data within +−1 to 2 standard deviations, [1σ, 2σ], [−1σ, −2σ]; contains 27.2% of the total data;
- $3^{rd}$ standard deviation band (denoted as the combination of 703a and 703b): data within +−2 to 3 standard deviations, [2σ, 3σ], [−2σ, −3σ]; contains 4.2% of the total data; and
- 4+ standard deviation band (denoted as the combination of 704a and 704b): data beyond +−3 standard deviations, [3σ, ∞], [−3σ, −∞]; contains 0.2% of the total data.

These Gaussian distribution characteristics form a predetermined statistical distribution, which may be used to detect faults by identifying meaningful deviations of the actual data from these statistical distribution characteristics.

Figure 8A:
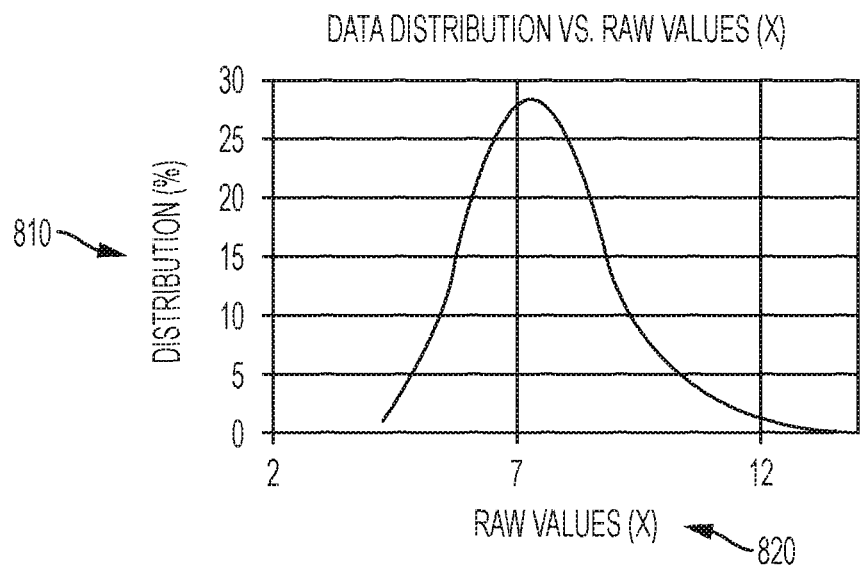
FIGS. 8A, 8B, and 8C illustrate an example use case of fault detection for non-Gaussian data distributions.
Figure 8B:
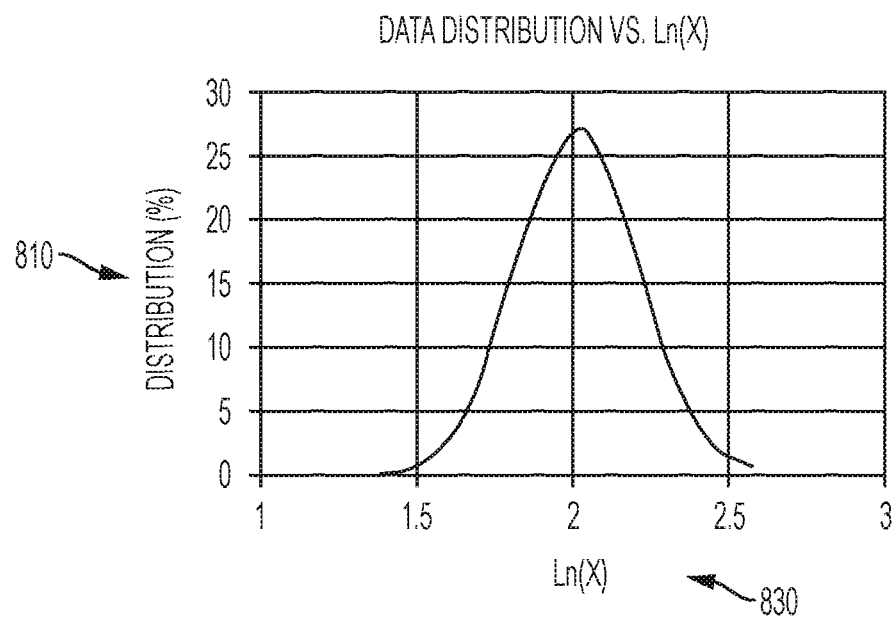
Figure 8C:
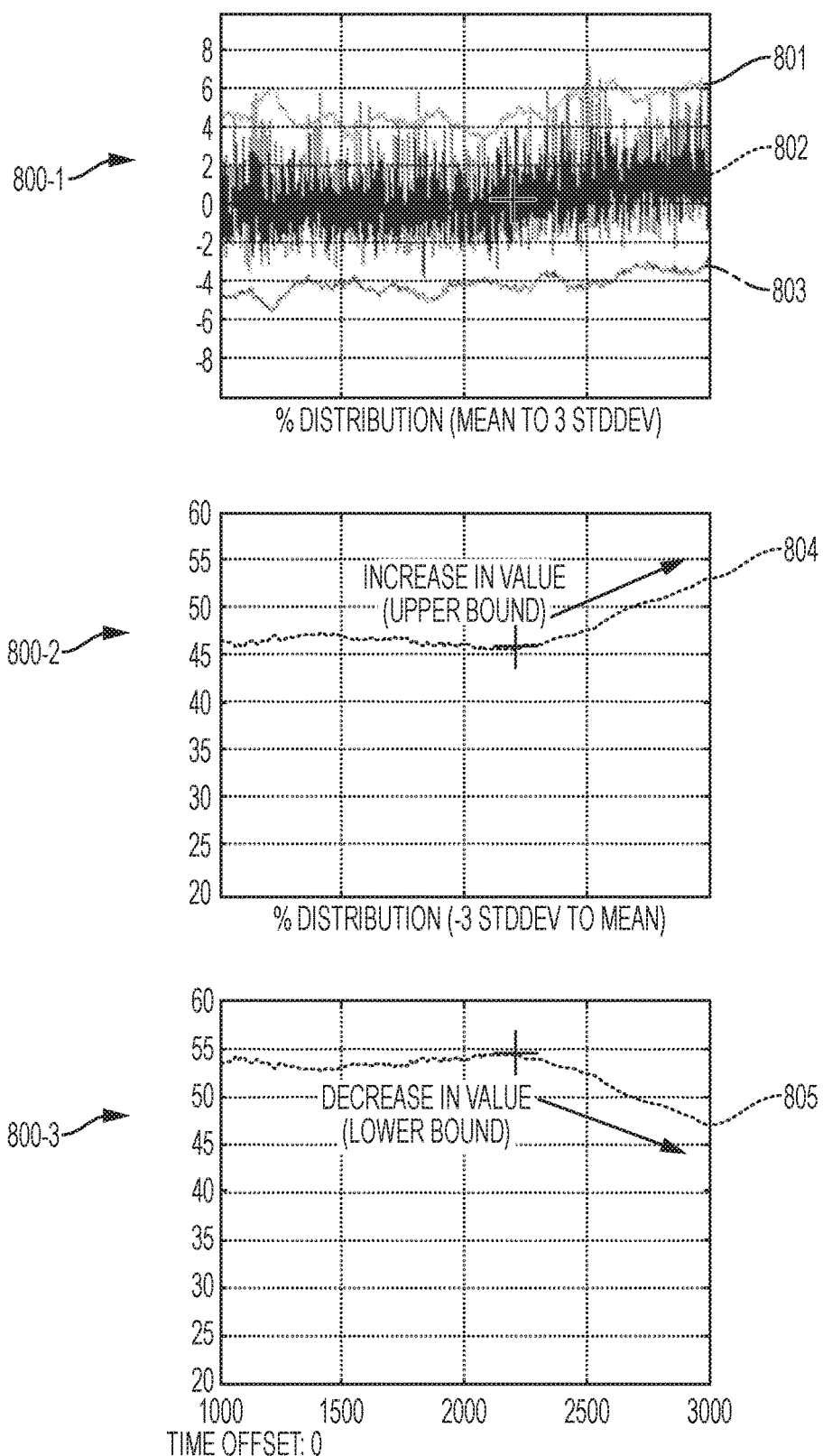

FIGS. 8A, 8B, and 8C (collectively, FIG. 8) illustrate an example use case of fault detection for non-Gaussian data distributions. As discussed throughout this disclosure, fault detection based on signal data distribution does not require Gaussian distributions—it can be implemented for use cases with any type of data distribution, such as log-normal distributions or any other non-Gaussian distribution.

FIGS. 8A and 8B illustrate the non-Gaussian data distribution for this use case. FIG. 8A illustrates the data distribution of the raw values (X) for this use case, and FIG. 8B illustrates the data distribution for the logarithm of the raw values (ln(X)) for this use case. As shown by these figures, the data distribution for this use case does not conform to the Gaussian distribution illustrated in FIG. 7.

FIG. 8C illustrates multiple fault detection approaches for this use case. Graph 800-1 of FIG. 8C illustrates fault detection using bounded signal limits, and graphs 800-2 and 800-3 of FIG. 8C illustrate fault detection based on signal data distribution.

Graph 800-1 of FIG. 8C illustrates fault detection for this use case using bounded signal limits. There are three signal calculations plotted by graph 800-1: signal 802 represents the delta between the actual sensor data and the baseline sensor data (i.e., delta=actual−baseline); signal 801 represents a fault detection limit of positive three standard deviations (+3σ); and signal 803 represents a fault detection limit of negative three standard deviations (−3σ). As described throughout this disclosure, fault detection approaches that use bounded signal limits may involve triggering fault alerts when there are multiple consecutive violations (e.g., three to five violations) of the delta signal 802 exceeding the fault detection limits (+−3σ) defined by signals 801 and 803. While graph 800-1 reveals various signal violations (e.g., from spurious signals and/or fault symptoms), those violations were isolated events and thus were not identified as faults. Accordingly, this fault detection approach failed to detect any anomalies or faults for this use case.

Graphs 800-2 and 800-3 of FIG. 8C illustrate fault detection for this use case based on signal data distribution. Graph 800-2 illustrates the upper-bound data distribution, which is the percentage of data within 3 standard deviations above the mean value of the Delta signal ([mean, $3\sigma$]). Graph 800-3 illustrates the lower-bound data distribution, which is the percentage of data within 3 standard deviations below the mean value of the Delta signal ([mean, $-3\sigma$]). Using this fault detection approach, the fault could have been detected around time 2200 when the total upper-bound distribution ([mean, $3\sigma$]) started increasing rapidly, as shown by the increase of signal 804. Similarly, the fault is confirmed by the decrease in the total lower-bound distribution ([mean, $-3\sigma$]), as shown by the decrease of signal 805.

Figure 9A:
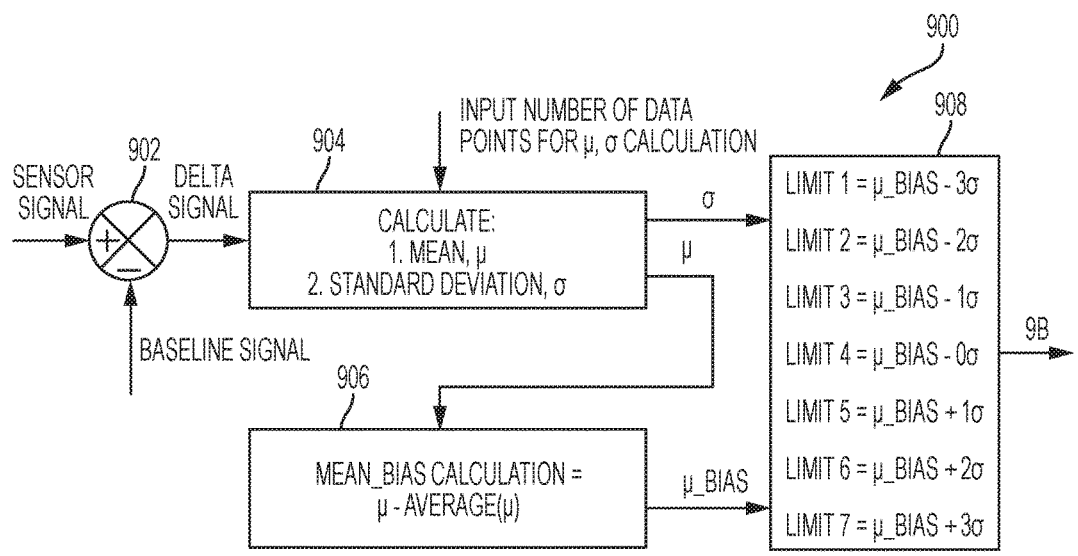
FIGS. 9A, 9B, and 9C illustrate an example embodiment of detecting faults based on data distribution characteristics.
Figure 9B:
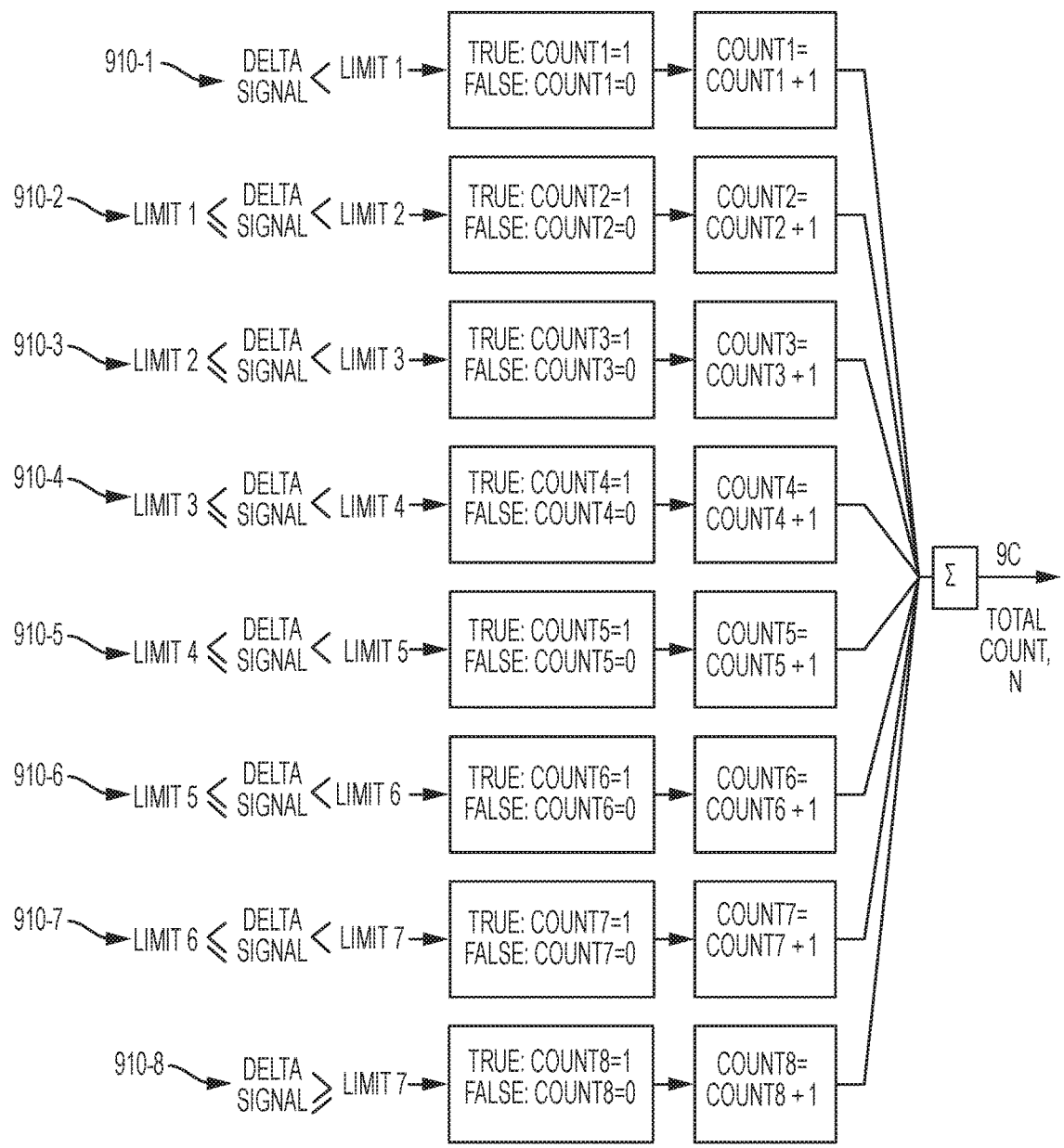
Figure 9C:
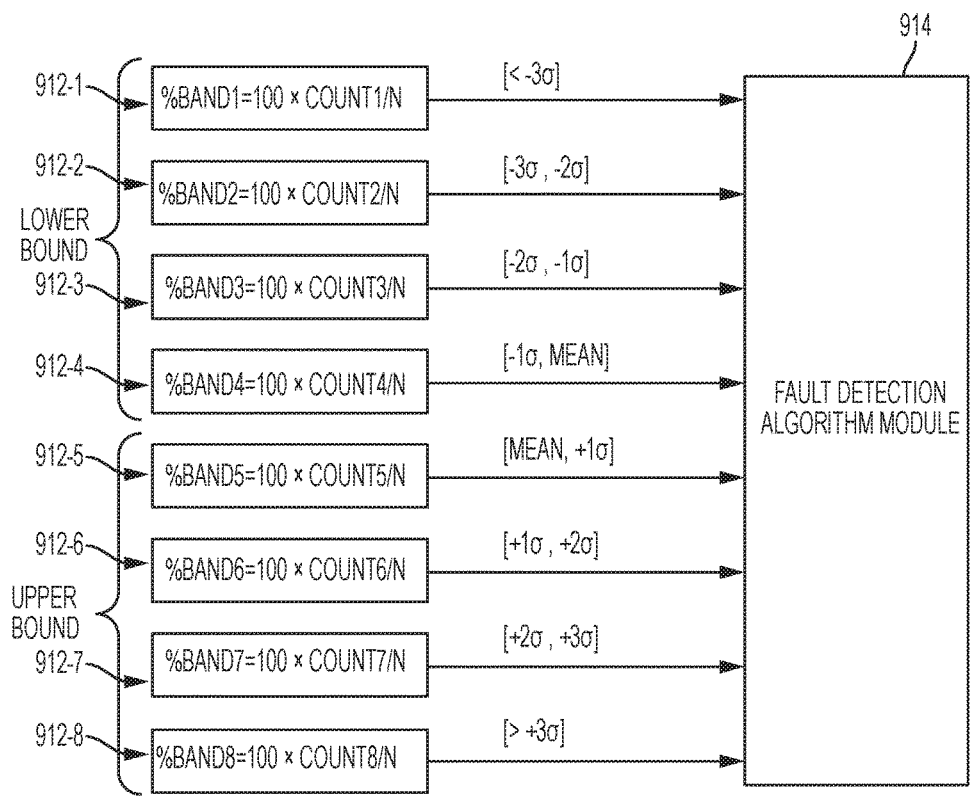

FIGS. 9A, 9B, and 9C (collectively, FIG. 9) illustrate an example embodiment of detecting faults based on data distribution characteristics. FIG. 9 illustrates a data classification algorithm for extracting the data distribution properties used in anomaly and fault detection based on data distribution characteristics.

First, in block 902, compute a delta signal based on the difference between the actual sensor signal and a baseline signal (i.e., delta=actual sensor signal−baseline signal). Next, in block 904, calculate the mean ($\mu$) and standard deviation ($\sigma$) of the delta signal using M points as moving average. Next, in block 906, calculate the mean bias ($\mu\_BIAS$). In the illustrated embodiment, for example, the mean bias ($\mu\_BIAS$) is calculated based on the difference between the mean ($\mu$) and AVERAGE($\mu$) (i.e., mean bias ($\mu\_BIAS$)=$\mu$−AVERAGE($\mu$)). It may be preferable in some embodiments to calculate AVERAGE($\mu$) over a short-term period, for example, using 3 to 7 data points. In other embodiments, the mean bias ($\mu\_BIAS$) may be calculated using any other function suited for a particular application.

Next, in block 908, using the standard deviation ($\sigma$) and mean bias ($\mu\_BIAS$) as input, calculate all 7 limits that will be used to classify the data into different statistical bands. For example, in some embodiments, the limits may be calculated as follows:

LIMIT 1=$\mu\_BIAS-3\sigma$;

LIMIT 2=$\mu\_BIAS-2\sigma$;

LIMIT 3=$\mu\_BIAS-1\sigma$;

LIMIT 4=$\mu\_BIAS-0\sigma$;

LIMIT 5=$\mu\_BIAS+1\sigma$;

LIMIT 6=$\mu\_BIAS+2\sigma$; and

LIMIT 7=$\mu\_BIAS+3\sigma$.

Next, in blocks 910-1 through 910-8, compare the delta signal with the 7 calculated limits to classify and count the number of data points in the delta signal within each class or statistical band:

if DELTA SIGNAL<LIMIT 1, then increase COUNT 1;
if LIMIT 1<=DELTA SIGNAL<LIMIT 2, then increase COUNT 2;
if LIMIT 2<=DELTA SIGNAL<LIMIT 3, then increase COUNT 3;
if LIMIT 3<=DELTA SIGNAL<LIMIT 4, then increase COUNT 4;
if LIMIT 4<=DELTA SIGNAL<LIMIT 5, then increase COUNT 5;
if LIMIT 5<=DELTA SIGNAL<LIMIT 6, then increase COUNT 6;
if LIMIT 6<=DELTA SIGNAL<LIMIT 7, then increase COUNT 7; and
if DELTA SIGNAL>=LIMIT 7, then increase COUNT 8.

After classifying and counting the data points in the delta signal, in blocks 912-1 through 912-8, calculate the distribution percentage for each of the 8 statistical distribution bands. For example, in some embodiments, the distribution percentages for each statistical band may be calculated as follows (where N is the total number of data points under consideration):

$1^{st}$ BAND %=100*COUNT1/$N$;

$2^{nd}$ BAND %=100*COUNT2/$N$;

$3^{rd}$ BAND %=100*COUNT3/$N$;

$4^{th}$ BAND %=100*COUNT4/$N$;

$5^{th}$ BAND %=100*COUNT5/$N$;

$6^{th}$ BAND %=100*COUNT6/$N$;

$7^{th}$ BAND %=100*COUNT7/$N$; and $8^{th}$ BAND %=100*COUNT8/$N$.

There are 4 lower-bound bands (912-1 through 912-4) and 4 upper-bound bands (912-5 through 912-8), and the 8 total bands collectively form a signal distribution pack (SDP). At block 914, feed the SDP into the fault detection algorithm module (FDAM) for further analysis. The FDAM may be, for example, a separate module that may receive multiple SDPs from multiple delta signals, as a system may have several points of monitoring. The FDAM may detect faults based on the consolidated fault symptoms detected in each SDP. In some embodiments, the baseline data for each sensor may be normalized against its operating condition, and the collective baseline data for all sensors may then be collapsed or grouped into a single set of normalized baseline data, which may improve accuracy when comparing actual sensor data to baseline data. In some embodiments, the FDAM may access and process the SDPs and associated information locally or through the cloud, depending on the application and the needs of the overall fault management/monitoring solution.

Figure 10:
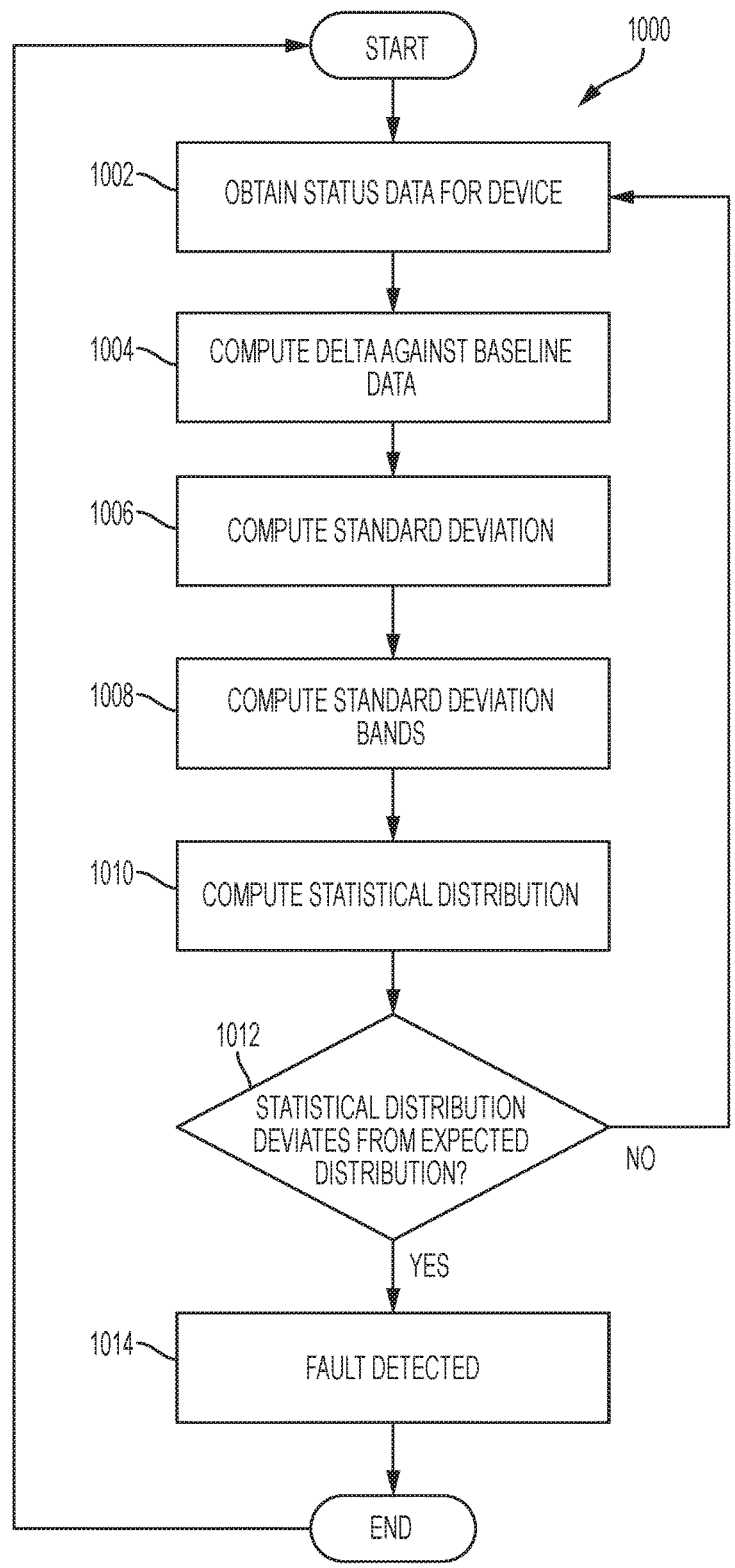
FIG. 10 illustrates a flowchart for an example embodiment of detecting faults based on data distribution characteristics.

FIG. 10 illustrates a flowchart 1000 for an example embodiment of detecting faults based on data distribution characteristics. Flowchart 1000 may be implemented, in some embodiments, by the components described throughout this disclosure in connection with the other figures.

The flowchart may begin at block 1002 by obtaining status data for a device. For example, the operation of a device may be monitored using one or more types of sensors that measure various operational attributes of the device, and status data for the device may be obtained from these sensor measurements. The flowchart may then proceed to block 1004 to compute a delta between the status data for the device and corresponding baseline data. The baseline data may identify operational attributes of the device during normal or healthy operation. For example, during the steady-state operation of a healthy device, the sensor measurements may be recorded to establish the baseline data. In some embodiments, the baseline data for the sensors may then be normalized to accommodate for the various operational attributes being monitored by each sensor.

The flowchart may then proceed to block 1006 to compute the standard deviation of the delta. The flowchart may then proceed to block 1008 to compute a plurality of standard deviation bands using the standard deviation of the delta. Each standard deviation band, for example, may correspond to a range of values that are beyond the mean or average by some multiple of the standard deviation. For example, in some embodiments, the following standard deviation bands may be used:

above 3 standard deviations $[3\sigma, \infty]$;
2 to 3 standard deviations $[2\sigma, 3\sigma]$;
1 to 2 standard deviations $[1\sigma, 2\sigma]$;
mean to 1 standard deviation $[mean, 1\sigma]$;
mean to −1 standard deviation $[mean, -1\sigma]$;
−1 to −2 standard deviations $[-1\sigma, -2\sigma]$;
−2 to −3 standard deviations $[-2\sigma, -3\sigma]$; and
below −3 standard deviations $[-3\sigma, -\infty]$.

The flowchart may then proceed to block 1010 to compute the statistical distribution of the delta in each of the plurality of standard deviation bands. For example, the statistical distribution may be calculated by determining the percentage of the delta's collective data points that are within each standard deviation band.

The flowchart may then proceed to block 1012 to determine whether the statistical distribution of the delta deviates from its expected statistical distribution. For example, a given use case may conform to an expected distribution of data during healthy operation, such as a Gaussian distribution, a log-normal distribution, or any other non-Gaussian distribution. If the computed statistical distribution for a given use case deviates meaningfully from its expected statistical distribution, it may be indicative of a fault, degradation, or other anomaly. Thus, if it is determined at block 1012 that the statistical distribution of the delta meaningfully deviates from its expected statistical distribution, the flowchart may then proceed to block 1014, where a fault is detected. Detection of the fault may then trigger an alert and/or any other appropriate remedial action. At this point, the flowchart may be complete. In some embodiments, however, the flowchart may restart and/or certain steps may be repeated.

If it is determined at block 1012 that the statistical distribution of the delta does not deviate from its expected statistical distribution, then no anomalies and/or fault symptoms have been detected based on the device's operation. The flowchart may then restart, to continue monitoring the device for faults in the manner described above in connection with blocks 1002-1014.

While some of the systems and solution described and illustrated herein have been described as containing or being associated with a plurality of elements, not all elements explicitly illustrated or described may be utilized in each alternative implementation of the present disclosure. Additionally, one or more of the elements described herein may be located external to a system, while in other instances, certain elements may be included within or as a portion of one or more of the other described elements, as well as other elements not described in the illustrated implementation. Further, certain elements may be combined with other components, as well as used for alternative or additional purposes in addition to those purposes described herein.

Further, it should be appreciated that the examples presented above are non-limiting examples provided merely for purposes of illustrating certain principles and features and not necessarily limiting or constraining the potential embodiments of the concepts described herein. For instance, a variety of different embodiments can be realized utilizing various combinations of the features and components described herein, including combinations realized through the various implementations of components described herein. Other implementations, features, and details should be appreciated from the contents of this Specification.

Figure 11:
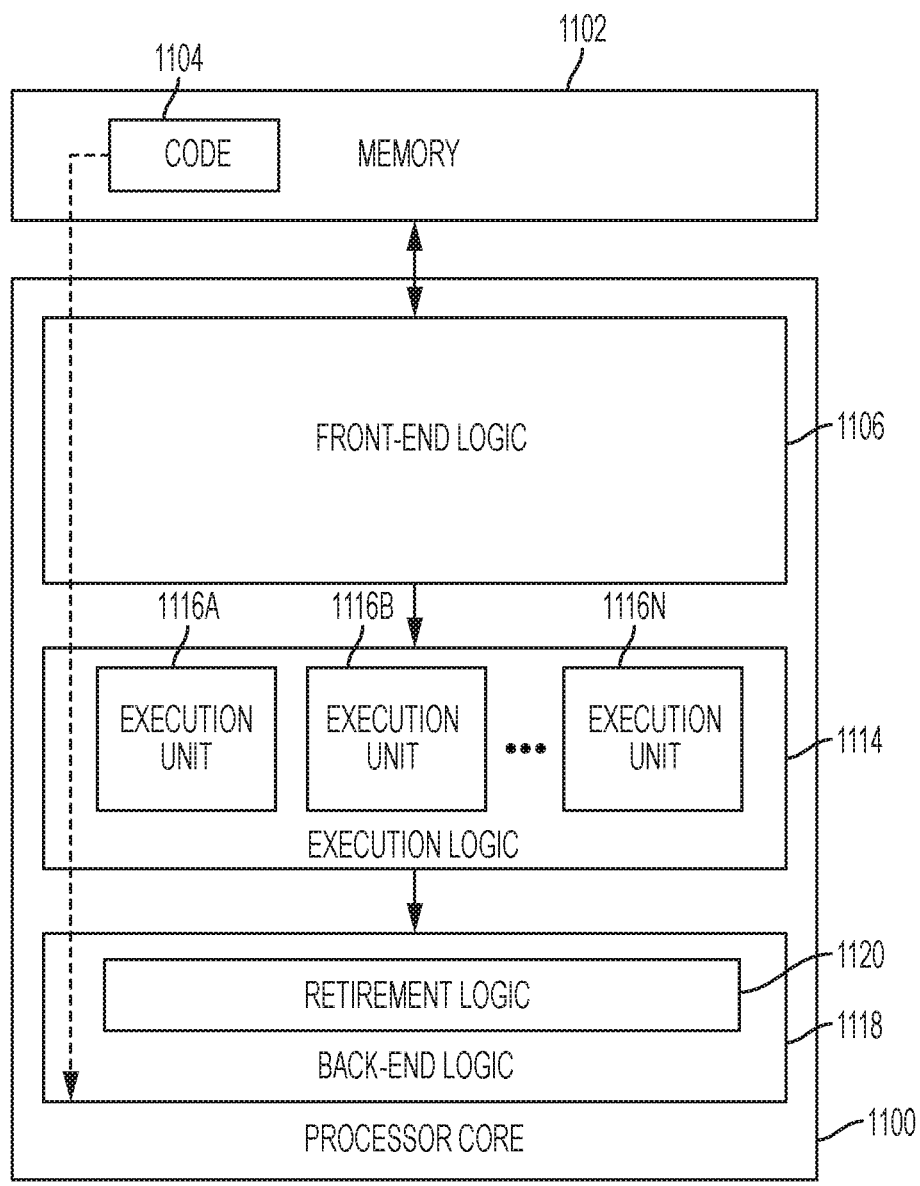
FIG. 11 illustrates a block diagram for an example embodiment of a processor.
Figure 12:
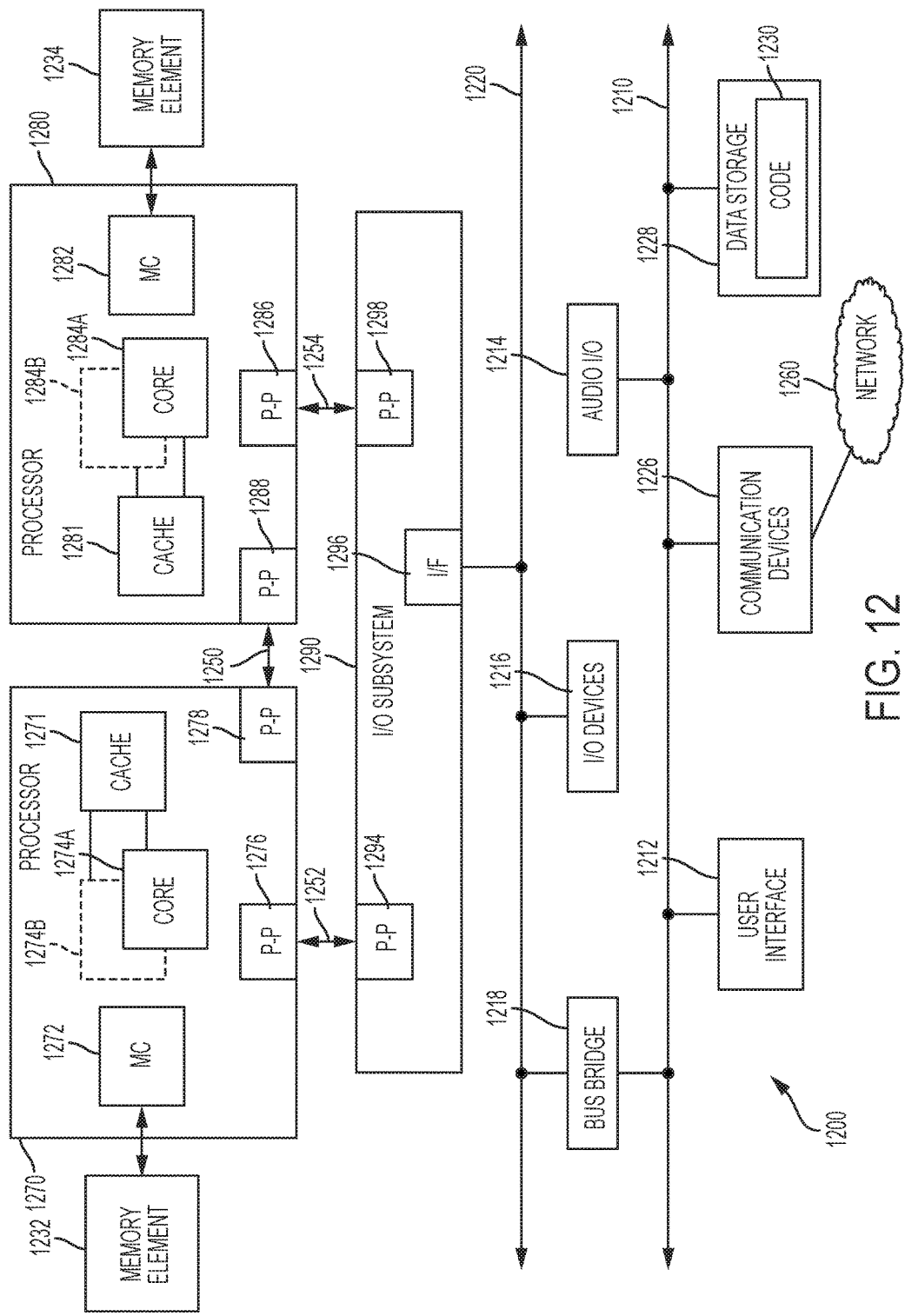
FIG. 12 illustrates a block diagram for an example embodiment of a computing system.

FIGS. 11-12 are block diagrams of exemplary computer architectures that may be used in accordance with embodiments disclosed herein. Other computer architecture designs known in the art for processors and computing systems may also be used. Generally, suitable computer architectures for embodiments disclosed herein can include, but are not limited to, configurations illustrated in FIGS. 11-12.

FIG. 11 illustrates a block diagram for an example embodiment of a processor 1100. Processor 1100 is an example of a type of hardware device that can be used in connection with the implementations above. Processor 1100 may be any type of processor, such as a microprocessor, an embedded processor, a digital signal processor (DSP), a network processor, a multi-core processor, a single core processor, or other device to execute code. Although only one processor 1100 is illustrated in FIG. 11, a processing element may alternatively include more than one of processor 1100 illustrated in FIG. 11. Processor 1100 may be a single-threaded core or, for at least one embodiment, the processor 1100 may be multi-threaded in that it may include more than one hardware thread context (or "logical processor") per core.

FIG. 11 also illustrates a memory 1102 coupled to processor 1100 in accordance with an embodiment. Memory 1102 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 1100 can execute any type of instructions associated with algorithms, processes, or operations detailed herein. Generally, processor 1100 can transform an element or an article (e.g., data) from one state or thing to another state or thing.

Code 1104, which may be one or more instructions to be executed by processor 1100, may be stored in memory 1102, or may be stored in software, hardware, firmware, or any suitable combination thereof, or in any other internal or external component, device, element, or object where appropriate and based on particular needs. In one example, processor 1100 can follow a program sequence of instructions indicated by code 1104. Each instruction enters a front-end logic 1106 and is processed by one or more decoders 1108. The decoder may generate, as its output, a micro operation such as a fixed width micro operation in a predefined format, or may generate other instructions, microinstructions, or control signals that reflect the original code instruction. Front-end logic 1106 may also include register renaming logic and scheduling logic, which generally allocate resources and queue the operation corresponding to the instruction for execution.

Processor 1100 can also include execution logic 1114 having a set of execution units 1116a, 1116b, 1116n, etc. Some embodiments may include a number of execution units dedicated to specific functions or sets of functions. Other embodiments may include only one execution unit or one execution unit that can perform a particular function. Execution logic 1114 performs the operations specified by code instructions.

After completion of execution of the operations specified by the code instructions, back-end logic 1118 can retire the instructions of code 1104. In one embodiment, processor 1100 allows out of order execution but requires in order retirement of instructions. Retirement logic 1120 may take a variety of known forms (e.g., re-order buffers or the like). In this manner, processor 1100 is transformed during execution of code 1104, at least in terms of the output generated by the decoder, hardware registers and tables utilized by register renaming logic 1110, and any registers (not shown) modified by execution logic 1114.

Although not shown in FIG. 11, a processing element may include other elements on a chip with processor 1100. For example, a processing element may include memory control logic along with processor 1100. The processing element may include I/O control logic and/or may include I/O control logic integrated with memory control logic. The processing element may also include one or more caches. In some embodiments, non-volatile memory (such as flash memory or fuses) may also be included on the chip with processor 1100.

FIG. 12 illustrates a block diagram for an example embodiment of a computing system 1200. Computing system 1200 is arranged in a point-to-point (PtP) configuration according to an embodiment. In particular, FIG. 12 shows a system where processors, memory, and input/output devices are interconnected by a number of point-to-point interfaces. Generally, one or more of the computing systems described herein may be configured in the same or similar manner as computing system 1200.

Processors 1270 and 1280 may also each include integrated memory controller logic (MC) 1272 and 1282 to communicate with memory elements 1232 and 1234. In alternative embodiments, memory controller logic 1272 and 1282 may be discrete logic separate from processors 1270 and 1280. Memory elements 1232 and/or 1234 may store various data to be used by processors 1270 and 1280 in achieving operations and functionality outlined herein.

Processors 1270 and 1280 may be any type of processor, such as those discussed in connection with other figures. Processors 1270 and 1280 may exchange data via a point-to-point (PtP) interface 1250 using point-to-point interface circuits 1278 and 1288, respectively. Processors 1270 and 1280 may each exchange data with a chipset 1290 via individual point-to-point interfaces 1252 and 1254 using point-to-point interface circuits 1276, 1286, 1294, and 1298. In alternative embodiments, any or all of the PtP links illustrated in FIG. 12 could be implemented as a multi-drop bus rather than a PtP link.

Chipset 1290 may be in communication with a bus 1220 via an interface circuit 1296. Bus 1220 may have one or more devices that communicate over it, such as a bus bridge 1218 and I/O devices 1216. Via a bus 1210, bus bridge 1218 may be in communication with other devices such as a user interface 1212 (such as a keyboard, mouse, touchscreen, or other input devices), communication devices 1226 (such as modems, network interface devices, or other types of communication devices that may communicate through a computer network 1260), audio I/O devices 1214, and/or a data storage device 1228. Data storage device 1228 may store code 1230, which may be executed by processors 1270 and/or 1280. In alternative embodiments, any portions of the bus architectures could be implemented with one or more PtP links.

The computer system depicted in FIG. 12 is a schematic illustration of an embodiment of a computing system that may be utilized to implement various embodiments discussed herein. It will be appreciated that various components of the system depicted in FIG. 12 may be combined in a system-on-a-chip (SoC) architecture or in any other suitable configuration capable of achieving the functionality and features of examples and implementations provided herein.

Systems and methods, such as those illustrated and described throughout this disclosure, may include machine logic and/or instructions implemented in hardware and/or software, and/or embodied on one or more machine accessible storage mediums, to implement the solutions described throughout this disclosure and address the shortcomings of existing systems and methods.

Although this disclosure has been described in terms of certain implementations and generally associated methods, alterations and permutations of these implementations and methods will be apparent to those skilled in the art. For example, while operations may be described or illustrated in a particular order, this should not be understood as requiring that such operations be performed in the particular order shown or in sequential order, or that all illustrated operations must be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. Other variations are also within the scope of the following claims. While this disclosure contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The following examples pertain to embodiments in accordance with this disclosure.

One or more embodiments may include an apparatus, comprising: a memory to store operational information associated with a device, wherein the operational information is obtained using a sensor; and a processor to: obtain baseline data associated with the device, wherein the baseline data comprises an indication of an expected performance of the device during healthy operation; obtain status data associated with the device, wherein the status data is obtained based on the operational information associated with the device; compute delta data based on a difference between the status data and the baseline data; compute a standard deviation of the delta data; compute a plurality of standard deviation bands based on the standard deviation of the delta data; compute a statistical distribution of the delta data based on the plurality of standard deviation bands; and detect a fault in the device based on the statistical distribution of the delta data.

In one example embodiment of an apparatus, the processor to detect the fault in the device based on the statistical distribution of the delta data is further to determine that the statistical distribution of the delta data deviates from a predetermined statistical distribution.

In one example embodiment of an apparatus, the predetermined statistical distribution comprises a Gaussian distribution.

In one example embodiment of an apparatus, the predetermined statistical distribution comprises a non-Gaussian distribution.

In one example embodiment of an apparatus, the sensor comprises a virtual sensor.

In one example embodiment of an apparatus: the sensor comprises a plurality of sensors; and the baseline data comprises normalized baseline data for the plurality of sensors.

In one example embodiment of an apparatus: the processor to compute the statistical distribution of the delta data based on the plurality of standard deviation bands is further to compute a plurality of statistical distributions associated with the plurality of sensors; and the processor to detect the fault in the device based on the statistical distribution of the delta data is further to detect the fault based the plurality of statistical distributions associated with the plurality of sensors.

In one example embodiment of an apparatus, the delta data is computed based on a difference between a plurality of values associated with the status data and the baseline data.

One or more embodiments may include at least one machine accessible storage medium having instructions stored thereon, the instructions, when executed on a machine, cause the machine to: obtain baseline data associated with a device, wherein the baseline data comprises an indication of an expected performance of the device during healthy operation; obtain status data associated with the device, wherein the status data is obtained based on operational information monitored by a sensor; compute delta data based on a difference between the status data and the baseline data; compute a standard deviation of the delta data; compute a plurality of standard deviation bands based on the standard deviation of the delta data; compute a statistical distribution of the delta data based on the plurality of standard deviation bands; and detect a fault in the device based on the statistical distribution of the delta data.

In one example embodiment of a storage medium, the instructions that cause the machine to detect the fault in the device based on the statistical distribution of the delta data further cause the machine to determine that the statistical distribution of the delta data deviates from a predetermined statistical distribution.

In one example embodiment of a storage medium, the predetermined statistical distribution comprises a Gaussian distribution.

In one example embodiment of a storage medium, the predetermined statistical distribution comprises a non-Gaussian distribution.

In one example embodiment of a storage medium, the sensor comprises a virtual sensor.

In one example embodiment of a storage medium: the sensor comprises a plurality of sensors; and the baseline data comprises normalized baseline data for the plurality of sensors.

In one example embodiment of a storage medium: the instructions that cause the machine to compute the statistical distribution of the delta data based on the plurality of standard deviation bands further cause the machine to compute a plurality of statistical distributions associated with the plurality of sensors; and the instructions that cause the machine to detect the fault in the device based on the statistical distribution of the delta data further cause the machine to detect the fault based the plurality of statistical distributions associated with the plurality of sensors.

In one example embodiment of a storage medium, the delta data is computed based on a difference between a plurality of values associated with the status data and the baseline data.

One or more embodiments may include a system, comprising: a sensor to monitor operational information associated with a device; a memory to store the operational information associated with the device; and a processor to: obtain baseline data associated with the device, wherein the baseline data comprises an indication of an expected performance of the device during healthy operation; obtain status data associated with the device, wherein the status data is obtained based on the operational information monitored by the sensor; compute delta data based on a delta between the status data and the baseline data; compute a standard deviation of the delta data; compute a plurality of standard deviation bands based on the standard deviation of the delta data; compute a statistical distribution of the delta data based on the plurality of standard deviation bands; and detect a fault in the device based on the statistical distribution of the delta data.

In one example embodiment of a system, the processor to detect the fault in the device based on the statistical distribution of the delta data is further to determine that the statistical distribution of the delta data deviates from a predetermined statistical distribution.

In one example embodiment of a system: the sensor comprises a plurality of sensors; and the baseline data comprises normalized baseline data for the plurality of sensors.

In one example embodiment of a system: the processor to compute the statistical distribution of the delta data based on the plurality of standard deviation bands is further to compute a plurality of statistical distributions associated with the plurality of sensors; and the processor to detect the fault in the device based on the statistical distribution of the delta data is further to detect the fault based the plurality of statistical distributions associated with the plurality of sensors.

One or more embodiments may include a method, comprising: obtaining baseline data associated with a device, wherein the baseline data comprises an indication of an expected performance of the device during healthy operation; obtaining status data associated with the device, wherein the status data is obtained based on operational information monitored by a sensor; computing delta data based on a difference between the status data and the baseline data; computing a standard deviation of the delta data; computing a plurality of standard deviation bands based on the standard deviation of the delta data; computing a statistical distribution of the delta data based on the plurality of standard deviation bands; and detecting a fault in the device based on the statistical distribution of the delta data.

In one example embodiment of a method, detecting the fault in the device based on the statistical distribution of the delta data comprises determining that the statistical distribution of the delta data deviates from a predetermined statistical distribution.

In one example embodiment of a method, the predetermined statistical distribution comprises a Gaussian distribution.

In one example embodiment of a method: the sensor comprises a plurality of sensors; and the baseline data comprises normalized baseline data for the plurality of sensors.

In one example embodiment of a method: computing the statistical distribution of the delta data based on the plurality of standard deviation bands comprises computing a plurality of statistical distributions associated with the plurality of sensors; and detecting the fault in the device based on the statistical distribution of the delta data comprises detecting the fault based the plurality of statistical distributions associated with the plurality of sensors.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. An apparatus, comprising:
   a memory to store operational information associated with a device, wherein the operational information is obtained using a sensor; and
   a processor to:
      obtain baseline data associated with the device, wherein the baseline data comprises an indication of an expected performance of the device during healthy operation;
      obtain status data associated with the device, wherein the status data is obtained based on the operational information associated with the device;
      compute delta data based on a difference between the status data and the baseline data;
      compute a standard deviation of the delta data;
      compute a plurality of standard deviation bands based on the standard deviation of the delta data;
      compute a statistical distribution of the delta data based on the plurality of standard deviation bands; and
      detect a fault in the device based on the statistical distribution of the delta data.

2. The apparatus of claim 1, wherein the processor to detect the fault in the device based on the statistical distribution of the delta data is further to determine that the statistical distribution of the delta data deviates from a predetermined statistical distribution.

3. The apparatus of claim 2, wherein the predetermined statistical distribution comprises a Gaussian distribution.

4. The apparatus of claim 2, wherein the predetermined statistical distribution comprises a non-Gaussian distribution.

5. The apparatus of claim 1, wherein the sensor comprises a virtual sensor.

6. The apparatus of claim 1, wherein:
   the sensor comprises a plurality of sensors; and
   the baseline data comprises normalized baseline data for the plurality of sensors.

7. The apparatus of claim 6, wherein:
   the processor to compute the statistical distribution of the delta data based on the plurality of standard deviation bands is further to compute a plurality of statistical distributions associated with the plurality of sensors; and
   the processor to detect the fault in the device based on the statistical distribution of the delta data is further to detect the fault based on the plurality of statistical distributions associated with the plurality of sensors.

8. The apparatus of claim 1, wherein the delta data is computed based on a difference between a plurality of values associated with the status data and the baseline data.

9. At least one non-transitory machine accessible storage medium having instructions stored thereon, the instructions, when executed on a machine, cause the machine to:
   obtain baseline data associated with a device, wherein the baseline data comprises an indication of an expected performance of the device during healthy operation;
   obtain status data associated with the device, wherein the status data is obtained based on operational information monitored by a sensor;
   compute delta data based on a difference between the status data and the baseline data;
   compute a standard deviation of the delta data;
   compute a plurality of standard deviation bands based on the standard deviation of the delta data;
   compute a statistical distribution of the delta data based on the plurality of standard deviation bands; and
   detect a fault in the device based on the statistical distribution of the delta data.

10. The storage medium of claim 9, wherein the instructions that cause the machine to detect the fault in the device based on the statistical distribution of the delta data further cause the machine to determine that the statistical distribution of the delta data deviates from a predetermined statistical distribution.

11. The storage medium of claim 10, wherein the predetermined statistical distribution comprises a Gaussian distribution.

12. The storage medium of claim 10, wherein the predetermined statistical distribution comprises a non-Gaussian distribution.

13. The storage medium of claim 9, wherein the sensor comprises a virtual sensor.

14. The storage medium of claim 9, wherein:
   the sensor comprises a plurality of sensors; and
   the baseline data comprises normalized baseline data for the plurality of sensors.

15. The storage medium of claim 14, wherein:
   the instructions that cause the machine to compute the statistical distribution of the delta data based on the plurality of standard deviation bands further cause the machine to compute a plurality of statistical distributions associated with the plurality of sensors; and
   the instructions that cause the machine to detect the fault in the device based on the statistical distribution of the delta data further cause the machine to detect the fault based on the plurality of statistical distributions associated with the plurality of sensors.

16. The storage medium of claim 9, wherein the delta data is computed based on a difference between a plurality of values associated with the status data and the baseline data.

17. A system, comprising:
   a sensor to monitor operational information associated with a device;

a memory to store the operational information associated with the device; and a processor to:
obtain baseline data associated with the device, wherein the baseline data comprises an indication of an expected performance of the device during healthy operation;
obtain status data associated with the device, wherein the status data is obtained based on the operational information monitored by the sensor;
compute delta data based on a delta between the status data and the baseline data;
compute a standard deviation of the delta data;
compute a plurality of standard deviation bands based on the standard deviation of the delta data;
compute a statistical distribution of the delta data based on the plurality of standard deviation bands; and
detect a fault in the device based on the statistical distribution of the delta data.

18. The system of claim 17, wherein the processor to detect the fault in the device based on the statistical distribution of the delta data is further to determine that the statistical distribution of the delta data deviates from a predetermined statistical distribution.

19. The system of claim 17, wherein:
the sensor comprises a plurality of sensors; and
the baseline data comprises normalized baseline data for the plurality of sensors.

20. The system of claim 19, wherein:
the processor to compute the statistical distribution of the delta data based on the plurality of standard deviation bands is further to compute a plurality of statistical distributions associated with the plurality of sensors; and
the processor to detect the fault in the device based on the statistical distribution of the delta data is further to detect the fault based on the plurality of statistical distributions associated with the plurality of sensors.

21. A method, comprising:
obtaining baseline data associated with a device, wherein the baseline data comprises an indication of an expected performance of the device during healthy operation;
obtaining status data associated with the device, wherein the status data is obtained based on operational information monitored by a sensor;
computing delta data based on a difference between the status data and the baseline data;
computing a standard deviation of the delta data;
computing a plurality of standard deviation bands based on the standard deviation of the delta data;
computing a statistical distribution of the delta data based on the plurality of standard deviation bands; and
detecting a fault in the device based on the statistical distribution of the delta data.

22. The method of claim 21, wherein detecting the fault in the device based on the statistical distribution of the delta data comprises determining that the statistical distribution of the delta data deviates from a predetermined statistical distribution.

23. The method of claim 22, wherein the predetermined statistical distribution comprises a Gaussian distribution.

24. The method of claim 21, wherein:
the sensor comprises a plurality of sensors; and
the baseline data comprises normalized baseline data for the plurality of sensors.

25. The method of claim 24, wherein:
computing the statistical distribution of the delta data based on the plurality of standard deviation bands comprises computing a plurality of statistical distributions associated with the plurality of sensors; and
detecting the fault in the device based on the statistical distribution of the delta data comprises detecting the fault based on the plurality of statistical distributions associated with the plurality of sensors.

* * * * *